United States Patent
Lee et al.

(10) Patent No.: US 10,819,399 B2
(45) Date of Patent: Oct. 27, 2020

(54) METHOD FOR TRANSMITTING ANALOG BEAM-RELATED INFORMATION IN WIRELESS COMMUNICATION SYSTEM, AND ENTITY USING METHOD

(71) Applicant: LG ELECTRONICS INC., Seoul (KR)

(72) Inventors: Seungmin Lee, Seoul (KR); Hanbyul Seo, Seoul (KR); Yunjung Yi, Seoul (KR); Hyunho Lee, Seoul (KR); Dongkyu Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/325,172

(22) PCT Filed: Aug. 14, 2017

(86) PCT No.: PCT/KR2017/008836
§ 371 (c)(1),
(2) Date: Feb. 12, 2019

(87) PCT Pub. No.: WO2018/030875
PCT Pub. Date: Feb. 15, 2018

(65) Prior Publication Data
US 2019/0181922 A1 Jun. 13, 2019

Related U.S. Application Data

(60) Provisional application No. 62/374,722, filed on Aug. 12, 2016, provisional application No. 62/417,988, (Continued)

(51) Int. Cl.
*H04B 7/0408* (2017.01)
*H04B 7/06* (2006.01)
(Continued)

(52) U.S. Cl.
CPC ............ *H04B 7/0408* (2013.01); *H04B 7/06* (2013.01); *H04B 7/0617* (2013.01);
(Continued)

(58) Field of Classification Search
CPC ...... H04B 7/0408; H04B 7/06; H04B 7/0617; H04B 7/0626; H04B 7/0665;
(Continued)

(56) References Cited

U.S. PATENT DOCUMENTS

2007/0243878 A1* 10/2007 Taira ..................... H04W 16/28
455/450
2009/0116565 A1* 5/2009 Ahn ..................... H04B 7/0491
375/260
(Continued)

FOREIGN PATENT DOCUMENTS

| WO | 2015190648 | 12/2015 |
| WO | 2016060336 | 4/2016 |

OTHER PUBLICATIONS

PCT International Application No. PCT/KR2017/008836, International Search Report dated Nov. 23, 2017, 4 pages.

*Primary Examiner* — Chi H Pham
*Assistant Examiner* — Weibin Huang
(74) *Attorney, Agent, or Firm* — Lee Hong Degerman Kang Waimey

(57) ABSTRACT

The present invention provides a method by which a first entity transmits analog beam-related information in a wireless communication system, the method: determining analog beam-related information to be transmitted; and transmitting the analog beam-related information to a second entity on the basis of the determination.

10 Claims, 22 Drawing Sheets

Related U.S. Application Data filed on Nov. 4, 2016, provisional application No. 62/502,613, filed on May 6, 2017.

(51) Int. Cl.

| | | |
|---|---|---|
| *H04J 11/00* | (2006.01) | |
| *H04L 5/00* | (2006.01) | |
| *H04L 5/14* | (2006.01) | |
| *H04W 24/10* | (2009.01) | |
| *H04W 72/04* | (2009.01) | |

(52) U.S. Cl.
CPC ......... *H04B 7/0626* (2013.01); *H04B 7/0665* (2013.01); *H04B 7/0695* (2013.01); *H04J 11/0053* (2013.01); *H04L 5/0094* (2013.01); *H04L 5/14* (2013.01); *H04W 24/10* (2013.01); *H04W 72/0446* (2013.01); *H04L 5/005* (2013.01); *H04L 5/0048* (2013.01)

(58) Field of Classification Search
CPC .. H04B 7/0695; H04J 11/0053; H04L 5/0094; H04L 5/14; H04W 24/10; H04W 72/0446
See application file for complete search history.

(56) References Cited

U.S. PATENT DOCUMENTS

| | | | |
|---|---|---|---|
| 2011/0086663 A1* | 4/2011 | Gorokhov | H04W 52/244 455/522 |
| 2013/0040682 A1* | 2/2013 | Chang | H04B 7/0417 455/517 |
| 2014/0146782 A1* | 5/2014 | Gerlach | H04W 72/042 370/329 |
| 2014/0177486 A1 | 6/2014 | Wang et al. | |
| 2014/0286300 A1* | 9/2014 | Choi | H04L 1/0026 370/329 |
| 2015/0103784 A1 | 4/2015 | Hernando | |
| 2015/0372730 A1* | 12/2015 | Dinan | H04L 5/0053 370/329 |
| 2016/0142959 A1* | 5/2016 | Wang | H04W 36/245 455/436 |
| 2017/0163392 A1* | 6/2017 | Lim | H04W 72/0453 |
| 2017/0311276 A1* | 10/2017 | Tsai | H04B 7/0695 |

\* cited by examiner

METHOD FOR TRANSMITTING ANALOG BEAM-RELATED INFORMATION IN WIRELESS COMMUNICATION SYSTEM, AND ENTITY USING METHOD

CROSS-REFERENCE TO RELATED APPLICATIONS

This application is the National Stage filing under 35 U.S.C. 371 of International Application No. PCT/KR2017/008836, filed on Aug. 14, 2017, which claims the benefit of U.S. Provisional Application Nos. 62/374,722, filed on Aug. 12, 2016, 62/417,988, filed on Nov. 4, 2016, and 62/502,613, filed on May 6, 2017, the contents of which are all hereby incorporated by reference herein in their entirety.

BACKGROUND OF THE INVENTION

Field of the Invention

The present invention relates to wireless communication and, more particularly, to a method for transmitting analog beam-related information in a wireless communication system and an entity using the method.

Related Art

In the International Telecommunication Union Radio Communication Sector (ITU-R), standardization of International Mobile Telecommunication (IMT)-Advanced, a next generation mobile communication system after 3rd generation, is underway. IMT-Advanced aims to support IP (Internet Protocol) based multimedia service at data rates of 1 Gbps in a stationary and low-speed moving state and 100 Mbps in a high-speed moving state.

The 3rd Generation Partnership Project (3GPP) is a system standard that meets the requirements of IMT-Advanced, and LTE-Advanced (LTE-A), which has improved Long Term Evolution (LTE) based on Orthogonal Frequency Division Multiple Access (OFDMA)/Single Carrier-LTE-Advanced (LTE-A), is being prepared. LTE-A is one of the strong candidates for IMT-Advanced.

As communication devices increasingly require larger communication capacity, a need for improved mobile broadband communication over existing radio access technology (RAT) has emerged. Also, massive machine type communications (MTC), which provides various services anywhere and any time by connecting multiple devices and objects, is one of the major issues to be considered in next generation communication. In addition, communication system design considering service/UE sensitive to reliability and latency is under discussion, and in the next generation communication, communication considering analog beam, as well as digital beam, is considered.

As described above, the analog beam may be directional. In this context, when a specific base station (BS) (or a terminal (i.e., user equipment (UE)) performs analog beam transmission and reception in the same direction with another BS (or UE), the BS (or UE) is likely to be subjected to high interference by the other BS (or UE). Thus, the specific BS (or a UE) needs to know information regarding an analog beam at another BS (or UE) (in order to reduce interference caused by analog beam transmission and reception performed by the other base station (or UE)).

However, since the BS and the UE in the related art wireless communication technology do not perform wireless communication on the basis of the analog beam (or analog beamforming), the BS (or the UE) in the related art wireless communication technology does not exchange information regarding the analog beam with the other BS (or UE). Thus, the BS (or UE) in the related art has performs communication on the basis of its own analog beam, regardless of whether or not the other BS (or UE) performs communication on the basis of what type of analog beam, and as a result, communication on the basis of the analog beam of the BS (or the UE) in the related art is interfered with by the communication on the basis of the analog beam of the other BS (or the UE).

Therefore, the present invention proposes a method for preventing radio interference from another entity (e.g., a BS, a UE, etc.) by allowing BSs (or UEs, or between a UE and a BS) to exchange information regarding an analog beam.

SUMMARY OF THE INVENTION

The present invention provides a method for transmitting analog beam-related information performed by an entity in a wireless communication system and an entity using the same.

In an aspect, a method for transmitting analog beam-related information performed by a first entity in a wireless communication system is provided. The method may comprise determining information regarding an analog beam to be transmitted and transmitting the information regarding the analog beam to a second entity on the basis of the determination.

The first entity may be a damaged cell, the second entity may be an interference cell, and the information regarding the analog beam may include information identifying an analog beam of the damaged cell interfered with by the interference cell.

The information regarding the analog beam may include at least one of a cell identifier of the damaged cell, resource position information of the damaged cell with respect to the analog beam, load information of the damaged cell with respect to the analog beam, and interference information for each resource of the damaged cell with respect to the analog beam.

The first entity may be a damaged cell, the second entity is an interference cell, and the information regarding the analog beam may include information identifying an analog beam of the interference cell interfering with the damaged cell.

The information regarding the analog beam may further include a cell identifier of the interference cell and resource position information of the interference cell with respect to the analog beam.

The first entity may be a first cell, the second entity may be a second cell, the method may further comprise receiving a measurement value related to an analog beam regarding the second cell from a UE, Information regarding the analog beam may be determined on the basis of the measurement value.

The first entity may be a first cell, the second entity may be a second cell, the information regarding the analog beam may be analog beam information to which a flexible duplex operation is applied, and the analog beam information to which the flexible duplex operation is applied may include at least one of cell identifier information of the first cell, identifier information of the analog beam to which the flexible duplex operation is applied, and operation information regarding the flexible duplex operation.

The first entity may be a first cell, the second entity may be a second cell, the first cell and the second cell may use different numerologies, and the information regarding the analog beam may be information regarding flexible duplex.

The information regarding the flexible duplex may include at least one of periodicity information, numerology information, information regarding the number of symbols, and direction information.

the periodicity information may be information regarding a period in which the information regarding the flexible duplex is repeatedly applied, the numerology information may be information regarding subcarrier spacing for the period, the information regarding the number of symbols may be Information regarding the number of symbols in a basic time unit, and the direction information may be information regarding a transmission direction of each symbol constituting the basic time unit In another aspect, an entity, as a first entity, is provided. The entity may comprise a radio frequency (RF) unit transmitting and receiving a wireless signal and a processor connected to the RF unit to operate, wherein the processor determines information regarding an analog beam to be transmitted and transmits information regarding the analog beam to a second entity on the basis of the determination.

According to the present invention, a method of preventing radio interference by another entity (e.g., a BS, a UE, etc.) by allowing information regarding analog beams to be exchanged between BSs (or between UEs or between a UE and a BS) is proposed. In addition, in the present invention, criteria for exchanging information regarding which analog beams between the BSs (or between the UEs or between a UEs and a BS) are presented. Thus, when a BS (or a UE) according to the present invention performs wireless communication on the basis of an analog beam, the BS (or UE) may not be less interfered with by the other BS (or UE), thereby increasing overall efficiency of the wireless communication system.

DESCRIPTION OF EXEMPLARY EMBODIMENTS

Figure 1:
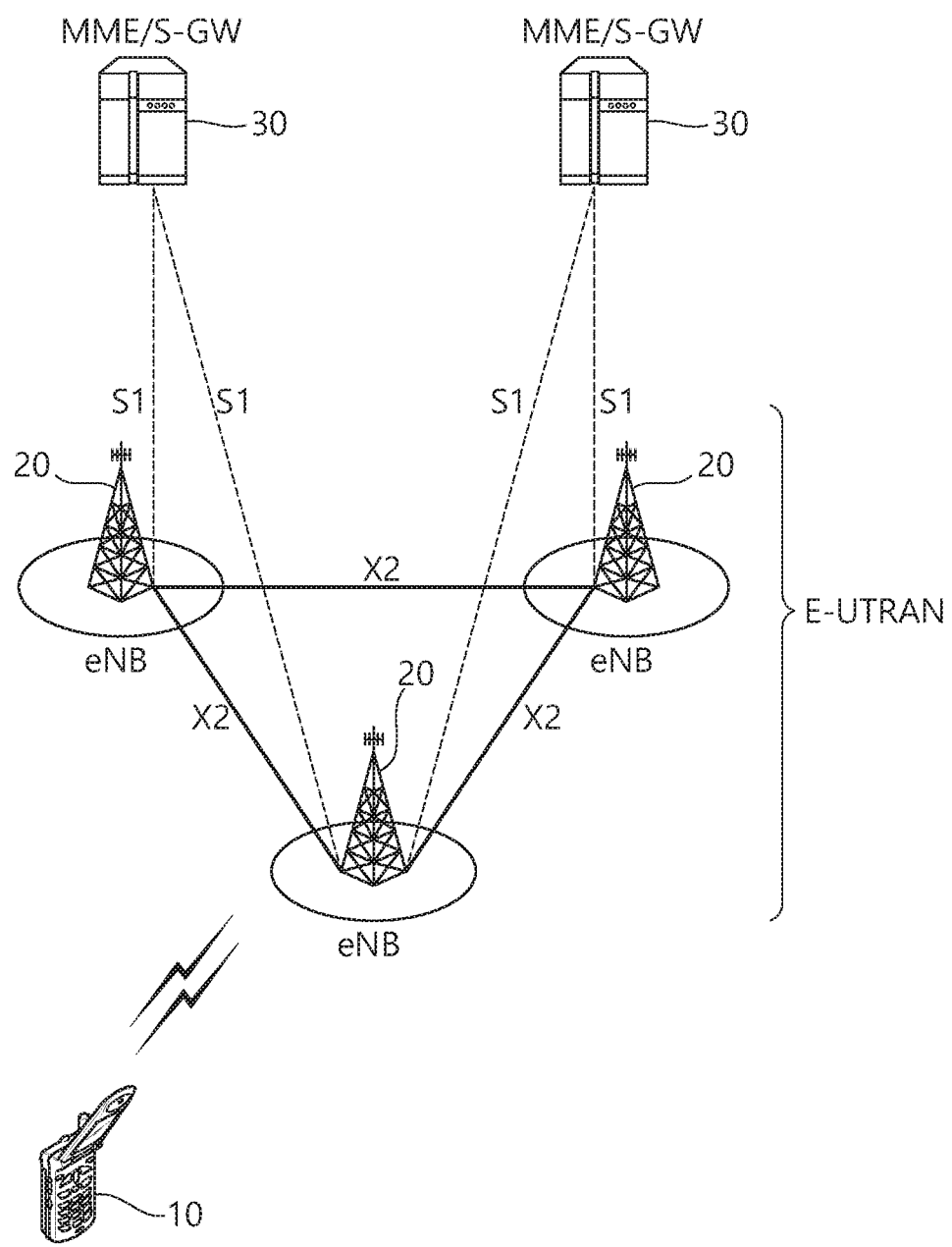
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
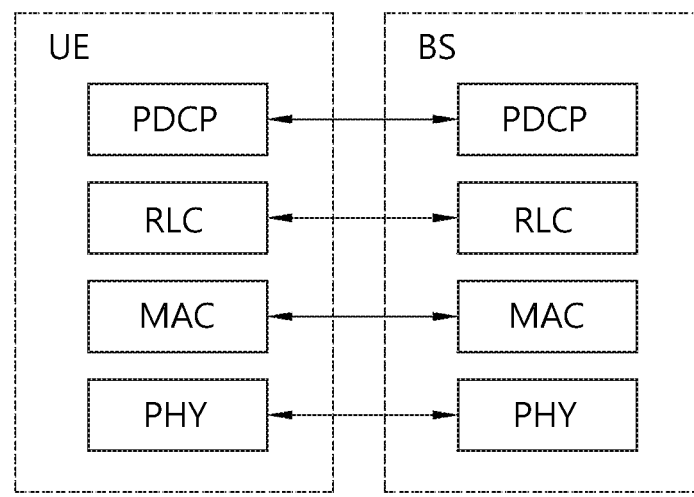
FIG. 2 is a diagram showing a wireless protocol architecture for a user plane.
Figure 3:
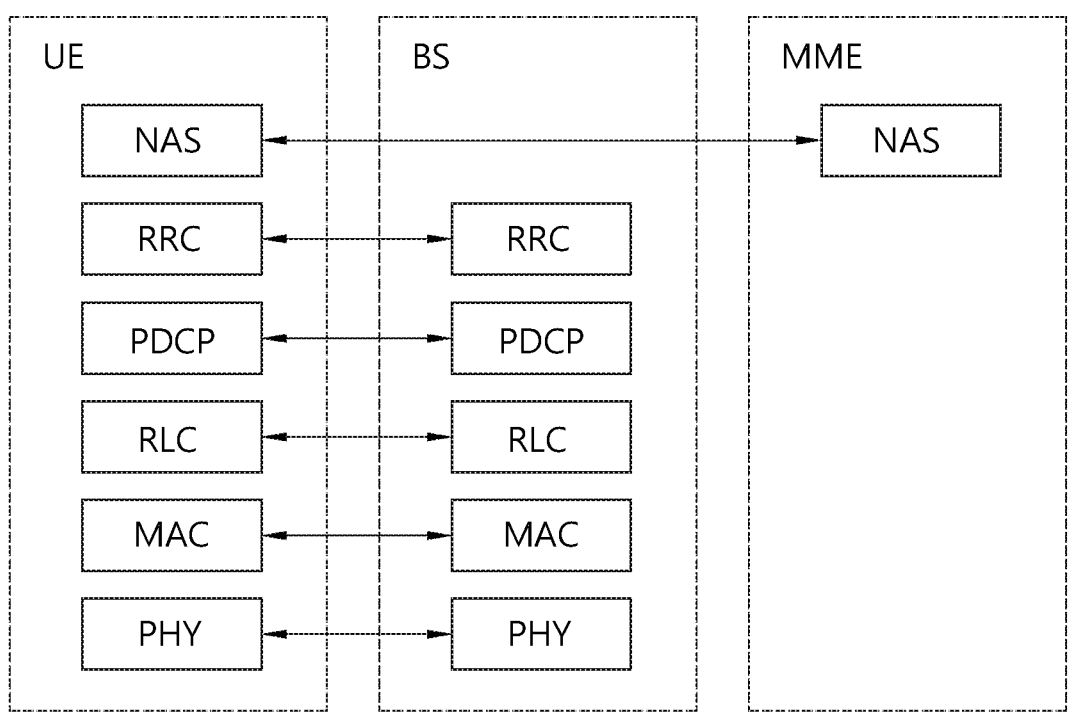
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a procedure of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

Hereinafter, a new radio access technology (new RAT) will be described.

As communication devices increasingly require larger communication capacity, a need for improved mobile broadband communication over existing radio access technology (RAT) has emerged. Also, massive machine type communications (MTC), which provides various services anywhere and any time by connecting multiple devices and objects, is one of the major issues to be considered in next generation communication. In addition, communication system design considering service/UE sensitive to reliability and latency is under discussion. The introduction of next generation radio access technology considering enhanced mobile broadband communication, massive MTC, ultra-reliable and low latency communication (URLLC), and the like, is under discussion, and in the present invention, the corresponding technology is called a new RAT. Hereinafter, technologies applied to the new RAT will be additionally described.

<Self-Contained Subframe Structure>

Figure 4:
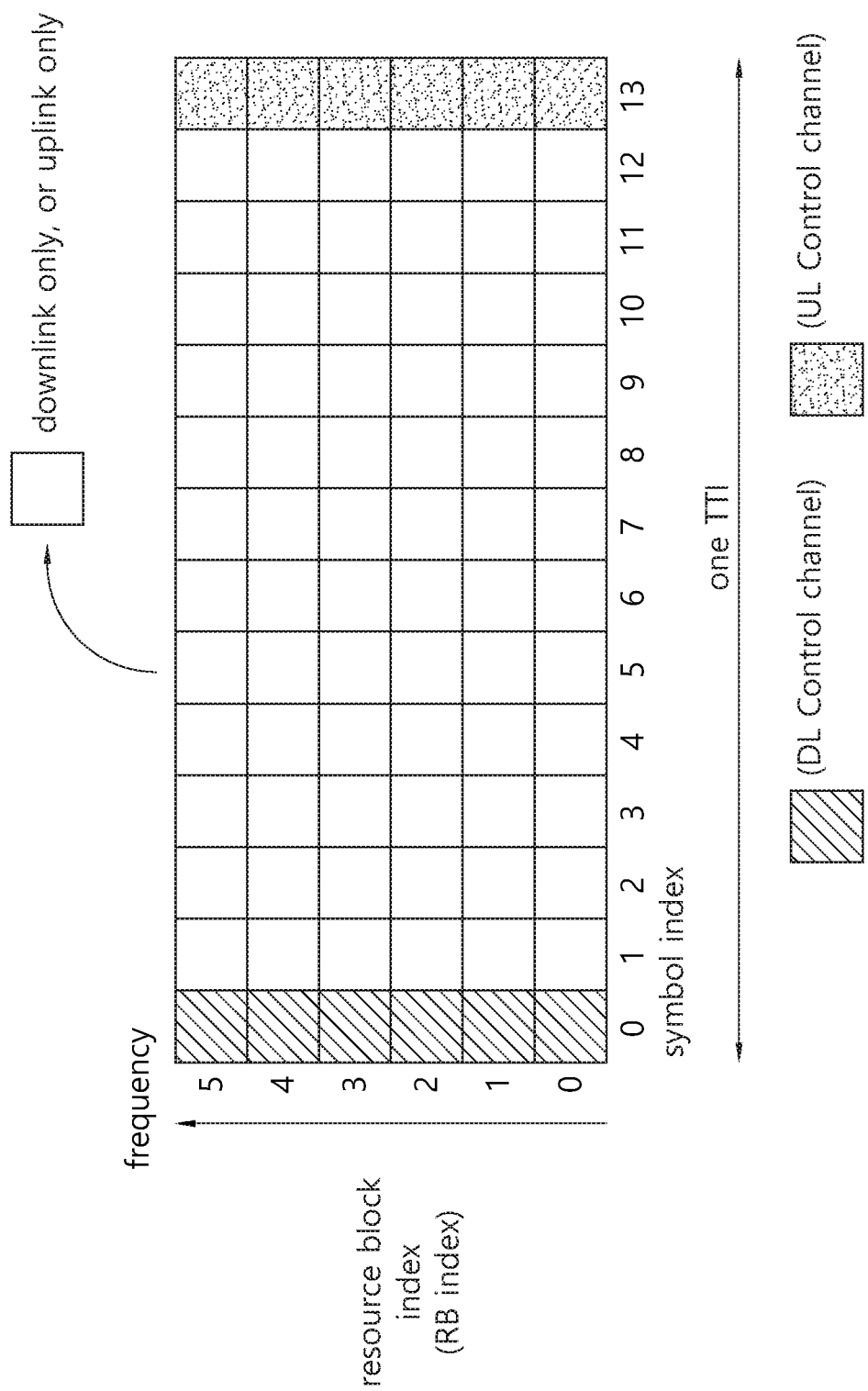
FIG. 4 schematically illustrates an example of a frame structure for a new RAT.

FIG. 4 schematically illustrates an example of a frame structure for a new RAT.

In order to minimize latency in the 5th-generation new RAT, a structure in which a control channel and a data channel are TDM-ed as illustrated in FIG. 4 may be considered as one of frame structures.

In FIG. 4, the shaded area represents a downlink control region, and the black area represents an uplink control region. The unmarked region may be used for downlink (DL) data transmission or uplink (UL) data transmission. This structure features that DL transmission and UL transmission are sequentially performed in one subframe so DL data may be transmitted and UL ACK/NACK may be received in the subframe. As a result, time taken for retransmit the data when a data transmission error occurs, thereby minimizing latency of transmission of final data.

In the self-contained subframe structure, a time gap is required for a process in which the BS and the UE is switched from a transmission mode to a reception mode or from a reception mode to a transmission mode. To this end, in the self-contained subframe structure, some OFDM symbols at a time point when DL is switched to UL are set to a guard period (GP).

<Analog Beamforming #1>

In the millimeter wave (mmW), a wavelength is shortened so that a plurality of antenna elements may be installed in the same area. That is, a total of 64 (8×8) antenna elements may be installed in a 2-dimension array at 0.5 lambda (wavelength) intervals on a 4 by 4 cm panel with a wavelength of 1 cm at a 30 GHz band. Therefore, in the mmW, a beamforming (BF) gain is increased using a plurality of antenna elements to increase coverage or throughput.

In this case, if each antenna element has a transceiver unit (TXRU) such that transmission power and phase adjustment are adjustable, independent beamforming may be performed for each frequency resource. However, installing the TXRU on all 100 antenna elements has a problem in terms of cost effectiveness. Therefore, a method of mapping a plurality of antenna elements to one TXRU and adjusting a direction of a beam by an analog phase shifter is considered. Such an analog beamforming method has a disadvantage in that it may make only one beam direction in the entire bands and cannot perform frequency selective beamforming.

Hybrid beamforming (hybrid BF) with B TXRUs that are fewer than Q antenna elements as an intermediate form between digital beamforming (Digital BF) and analog beamforming (analog BF) may be considered. In this case, although there is a difference according to connection methods of B TXRU and Q antenna elements, the number of beams that may be transmitted at the same time is limited to B or less.

Figure 5:
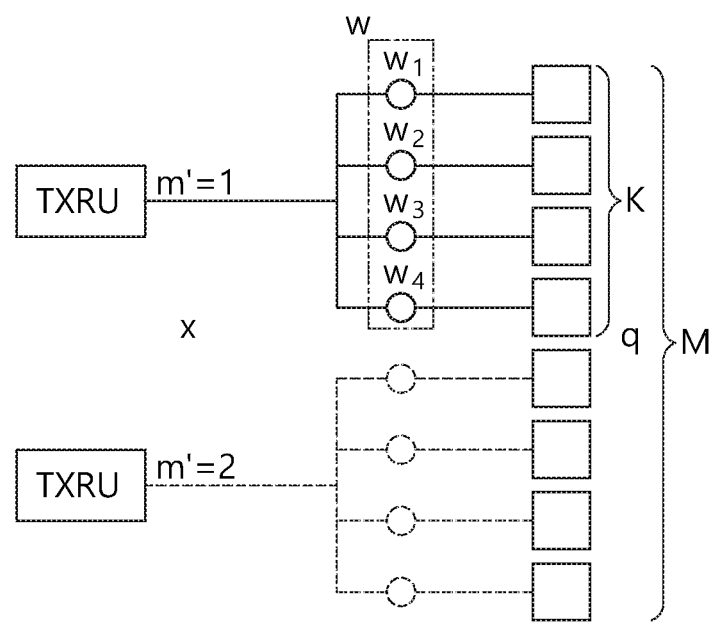
FIGS. 5 and 6 illustrate examples of a connection method of TXRUs and antenna elements.
Figure 6:
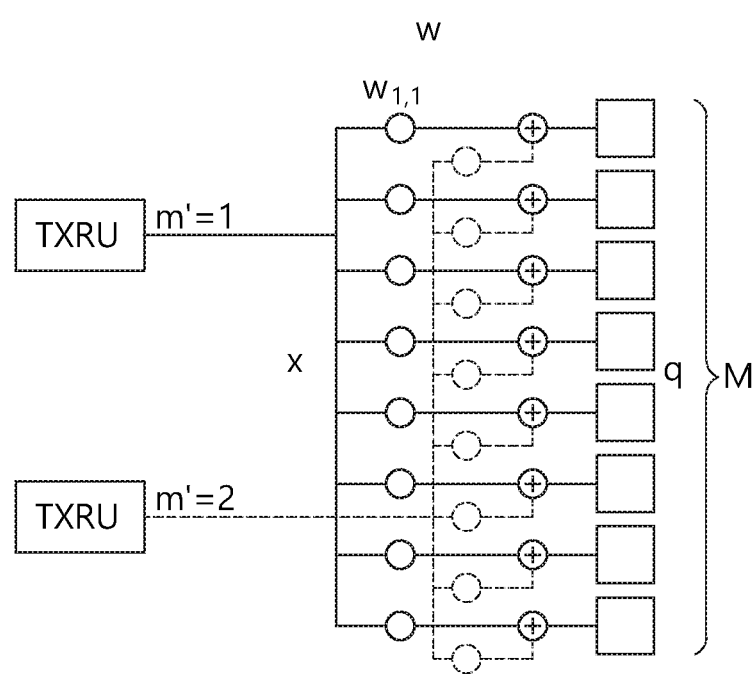

FIGS. 5 and 6 illustrate examples of a connection method of TXRUs and antenna elements.

Here, the TXRU virtualization model represents a relationship between output signals of the TXRUs and output signals of the antenna elements.

FIG. 5 illustrates a scheme in which a TXRU is connected to a sub-array. In this case, the antenna elements are connected to only one TXRU. FIG. 6 illustrates a scheme in which the TXRUs are connected to all the antenna elements. In this case, the antenna elements are connected to all TXRUs. In the figure, W represents a phase vector multiplied by an analog phase shifter. That is, a direction of the analog beamforming is determined by W. Here, mapping between the CSI-RS antenna ports and the TXRUs may be 1-to-1 or 1-to-many.

<Analog Beamforming #2>

A hybrid beamforming technique which combines digital beamforming and analog beamforming in the case of using multiple antennas has emerged. Here, analog beamforming (or RF beamforming) refers to an operation of performing precoding (or combining) in an RF end. In the hybrid beamforming, a baseband end and the RF end each perform precoding (or combining), so that performance close to digital beamforming may be obtained, while the number of RF chains and D/A (or A/D) converters is reduced. For the sake of convenience, the hybrid beamforming structure may be represented by N transceiver units (TXRU) and M physical antennas. Digital beamforming for L data layers to be transmitted at a transmission end may be represented by an N by L matrix, and N subsequently converted digital signals are converted through the TXRU to analog signals, and thereafter, analog beamforming represented by M by N matrix is applied.

Figure 7:
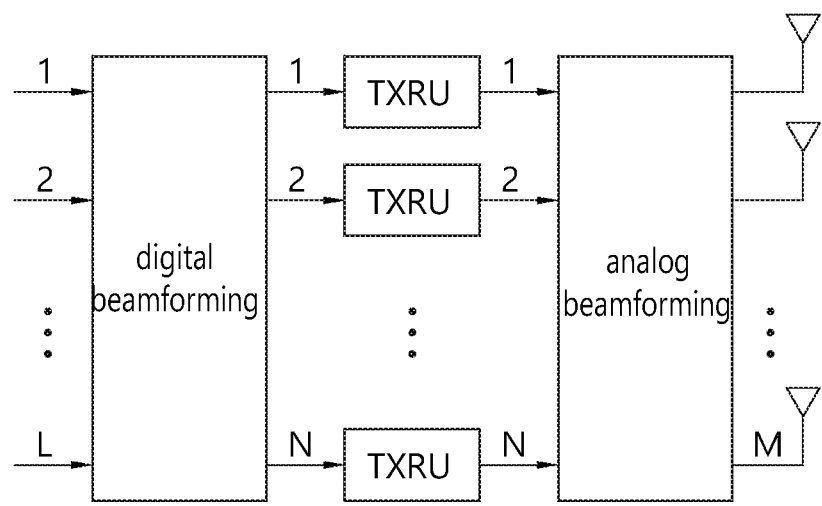
FIG. 7 is a view abstractly schematizing a hybrid beamforming structure in view of the TXRU and physical antennas.

FIG. 7 is a view abstractly schematizing a hybrid beamforming structure in view of the TXRU and physical antennas.

In FIG. 7, the number of digital beams is L and the number of analog beams is N. Further, in the new RAT system, it is considered that a BS is designed to change analog beamforming in units of symbols to support more efficient beamforming for a UE located in a specific area. In addition, in the new RAT system, even a scheme of introducing multiple antenna panels to which independently hybrid beamforming is applicable, when N TXRUs and M RF antennas are defined as one antenna panel in FIG. 7, is also considered.

When the BS utilizes a plurality of analog beams as described above, an analog beam advantageous for signal reception may be different for each UE, and thus, a beam sweeping operation in which the BS changes a plurality of analog beams to be supplied for each symbols in a specific subframe so that all the UEs may have a reception opportunity is considered.

Figure 8:
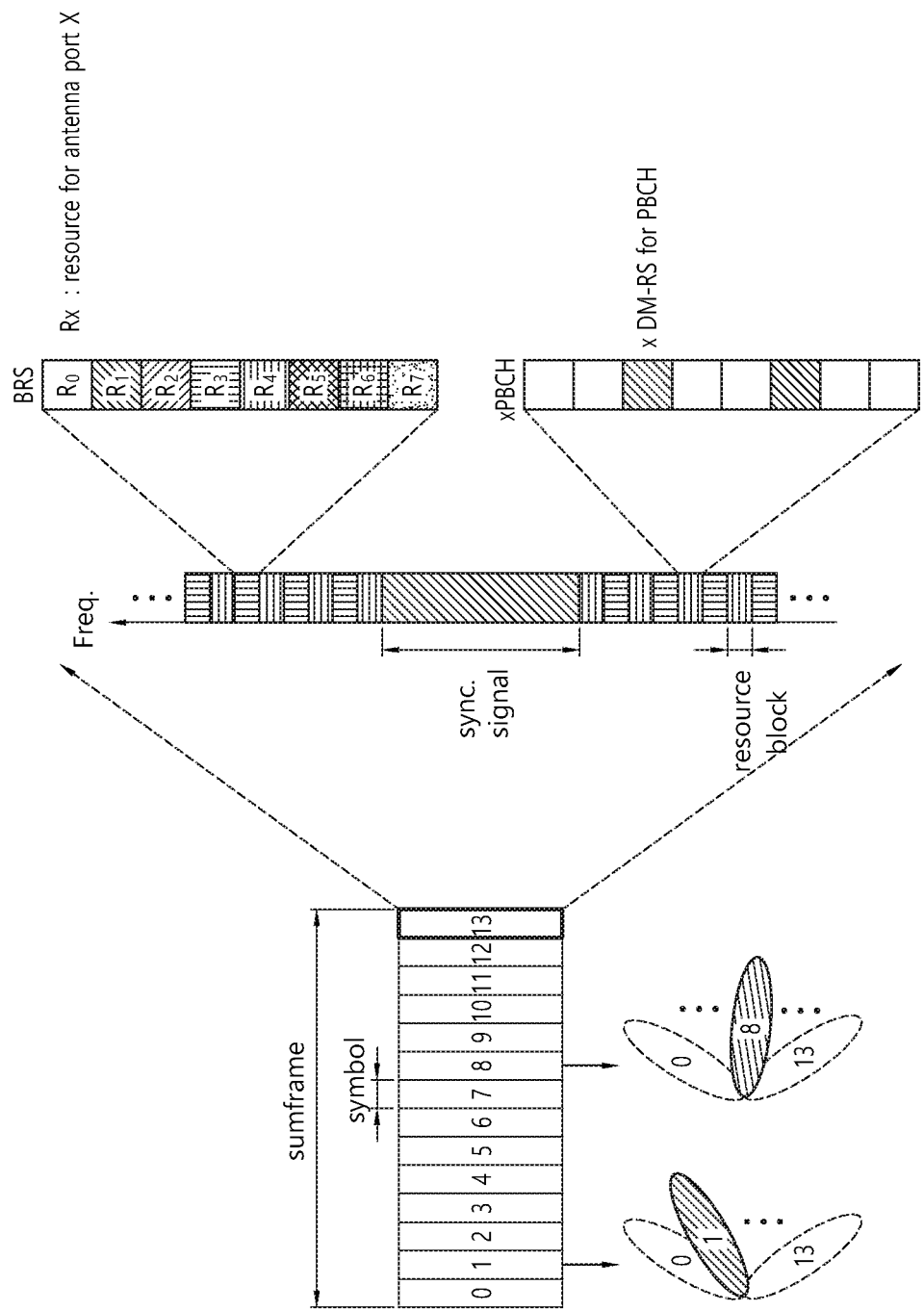
FIG. 8 is a view schematizing the beam sweeping operation for a synchronization signal and system information during a downlink (DL) transmission process.

FIG. 8 is a view schematizing the beam sweeping operation for a synchronization signal and system information during a downlink (DL) transmission process.

In FIG. 8, a physical resource (or a physical channel) in which system information of a new RAT system is transmitted in a broadcasting manner is referred to as an xPBCH (physical broadcast channel). Here, analog beams belonging to different antenna panels may be simultaneously transmitted within one symbol. In order to measure a channel for each analog beam, as illustrated in FIG. 8, a scheme of introducing a beam RS (BRS), which is a reference signal (RS) to which a single analog beam (corresponding to a specific antenna) is applied and transmitted, is under discussion. The BRS may be defined for a plurality of antenna ports, and each antenna port of the BRS may correspond to a single analog beam. Here, unlike the BRS, all the analog beams of an analog beam group may be applied to the synchronization signal or the xPBCH and transmitted so that a certain UE may receive the synchronization signal or xPBCH.

<Panel Array Antenna>

Figure 9:
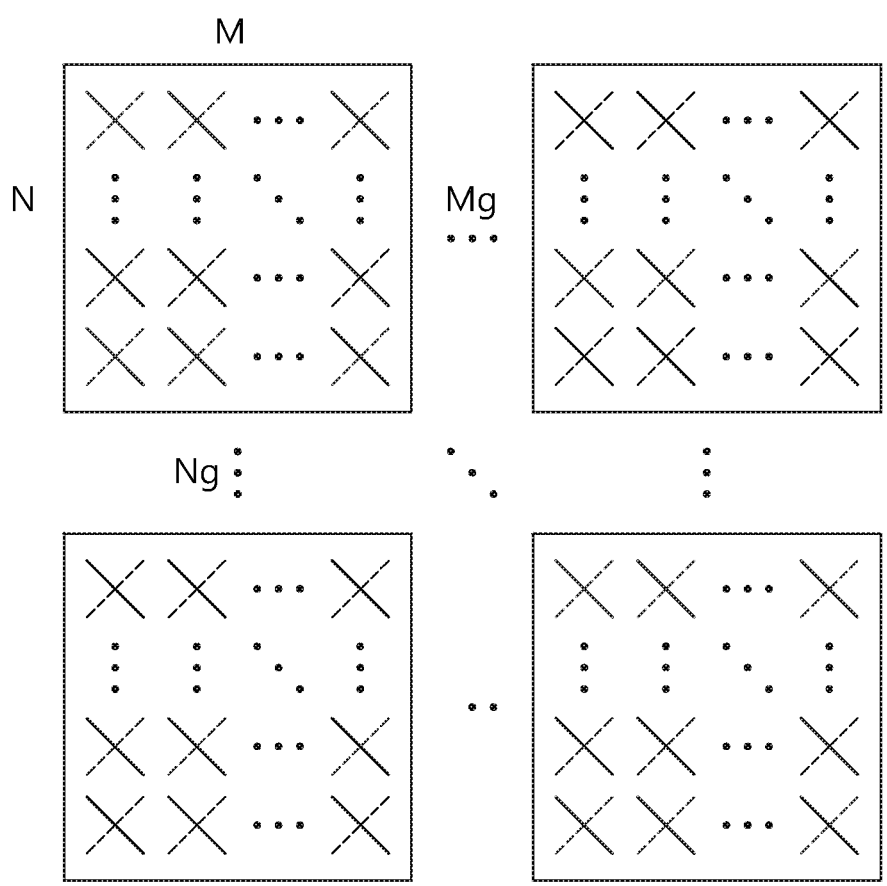
FIG. 9 schematically illustrates an example of a panel antenna array.

FIG. 9 schematically illustrates an example of a panel antenna array.

Referring to FIG. 9, it is assumed that a generalized panel antenna array of FIG. 9 includes Mg and Ng panels in a horizontal domain and a vertical domain, respectively, a single panel includes M rows and N rows, and an X-pol antenna is assumed. Therefore, a total number of antenna elements is 2*M*N*Mg*Ng.

<Feedback of Channel State Information (CSI)>

In a 3GPP LTE (-A) system, a user equipment (UE) is defined to report channel state information (CSI) to a BS, and channel state information (CSI) refers to information indicating quality of a wireless channel (or link) formed between a UE and an antenna port.

For example, a rank indicator (RI), a precoding matrix indicator (PMI), a channel quality indicator (CQI), and the like correspond thereto. Here, RI denotes rank information of a channel and refers to the number of streams that the UE receives through the same time-frequency resource. Since this value is determined to be dependent on long term fading of a channel, the RI generally has a period longer than that of the PMI and CSI and is fed back from the UE to the BS. The PMI is a value reflecting channel space characteristics and indicates a preferred precoding index of the UE on the basis of a metric such as SINR. The CQI is a value representing strength of a channel and generally refers to a reception SINR that may be obtained when the BS uses the PMI.

In the 3GPP LTE (-A) system, the BS may set a plurality of CSI processes for a UE and may be reported CSI for each process. Here, the CSI process includes CSI-RS for signal quality measurement from the BS and CSI-interference measurement (CSI-IM) resource for interference measurement.

<Virtualization of Reference Signal (RS)>

A physical downlink shared channel (PDSCH) may be transmitted only in one analog beam direction at a time point by analog beamforming at mmW. Therefore, data may be transmitted from the BS only to a small number of UEs present in the corresponding direction. Therefore, by setting different directions of the analog beam for each antenna port as necessary, data may be simultaneously transmitted to a plurality of UEs in the directions of the analog beam.

Figure 10:
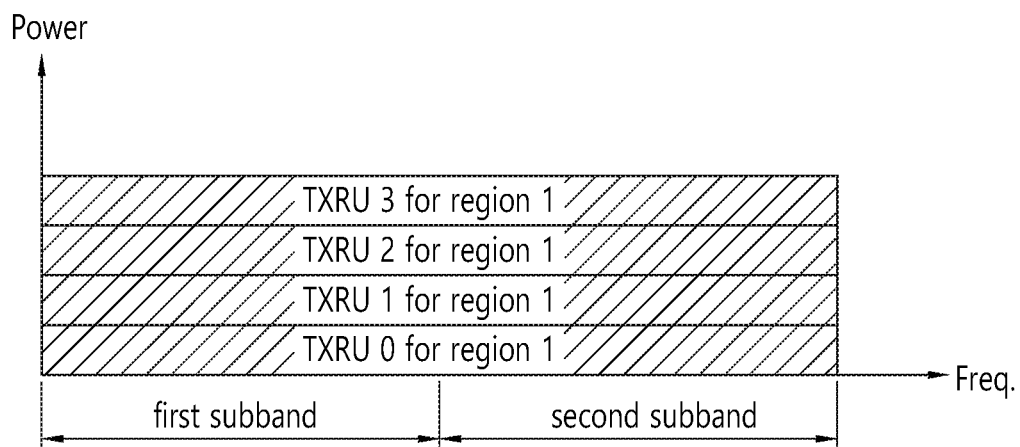
FIG. 10 schematically illustrates an example of a service region for each TXRU when all TXRUs have the same analog beamforming direction.
Figure 11:
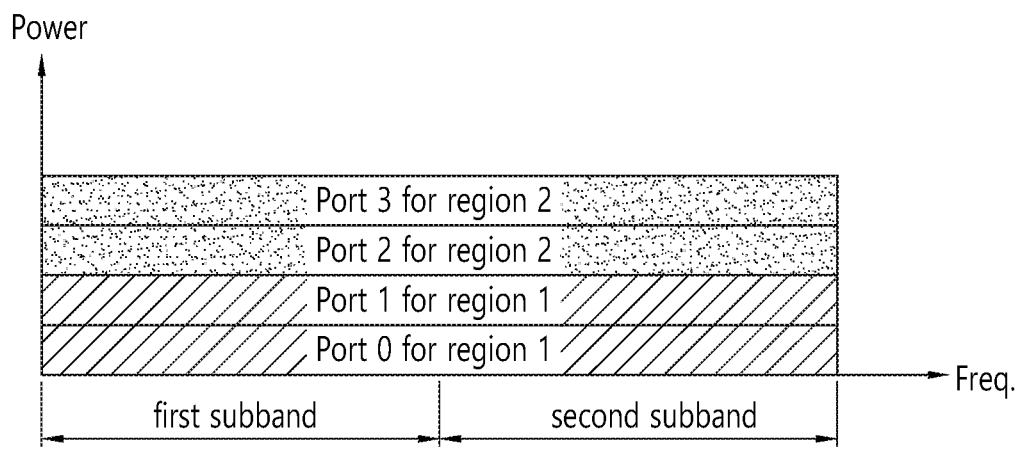
FIG. 11 schematically illustrates an example of a service region for each TXRU when each TXRU has different analog beamforming directions.
Figure 12:
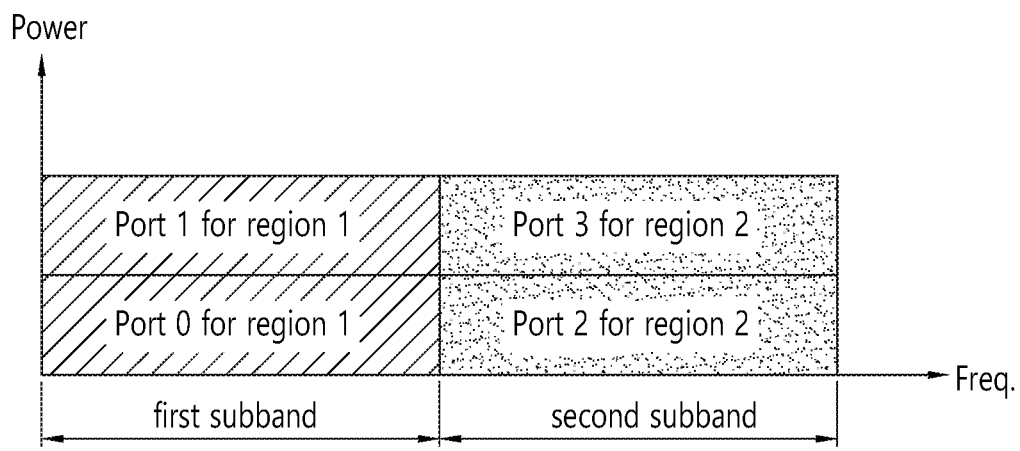
FIG. 12 schematically illustrates an example in which PDSCH1 transmitted to the UE1 and PDSCH2 transmitted to the UE2 are FDM-ed and transmitted.

Hereinafter, a structure in which 256 antenna elements are quartered to form four sub-arrays and a TXRU is connected to the sub-arrays as illustrated in FIGS. 10 to 12 will be described as an example.

When each sub-array includes a total of 64 (8×8) antenna elements in the form of a 2-dimension array, an area corresponding to a horizontal angle region of 15° and a vertical angle region of 15° may be covered by specific analog beamforming. That is, an area to be served by the BS is divided into a plurality of regions and the BS serves one region at a time. In the following description, it is assumed that a CSI-RS antenna fork and a TXRU are mapped in a 1-to-1 manner. Therefore, the antenna port and TXRU have the same meaning in the following description.

FIG. 10 schematically illustrates an example of a service region for each TXRU when all TXRUs have the same analog beamforming direction.

If all TXRUs (antenna ports, sub-arrays) have the same analog beamforming direction as illustrated in FIG. 10, a digital beam having a higher resolution may be formed to increase throughput of the corresponding area. Also, a rank of transmission data to the corresponding area may be increased to increase throughput of the corresponding area.

FIG. 11 schematically illustrates an example of a service region for each TXRU when each TXRU has different analog beamforming directions.

If the TXRUs (antenna port, sub-array) have different analog beamforming directions as illustrated in FIG. 11, data may be simultaneously transmitted in corresponding subframes (SFs) to UEs distributed in a wider region. As illustrated in the figure, two of the four antenna ports may be used for PDSCH transmission to UE1 in region 1 and the remaining two may be used for PDSCH transmission to UE2 in region 2. As in the example of the drawing, two antenna ports, among four antenna ports, may be used for PDSCH transmission to UE1 present in region 1 and the other two antenna ports may be used for PDSCH transmission to UE2.

FIG. 12 schematically illustrates an example in which PDSCH1 transmitted to the UE1 and PDSCH2 transmitted to the UE2 are FDM-ed and transmitted.

Figure 14:
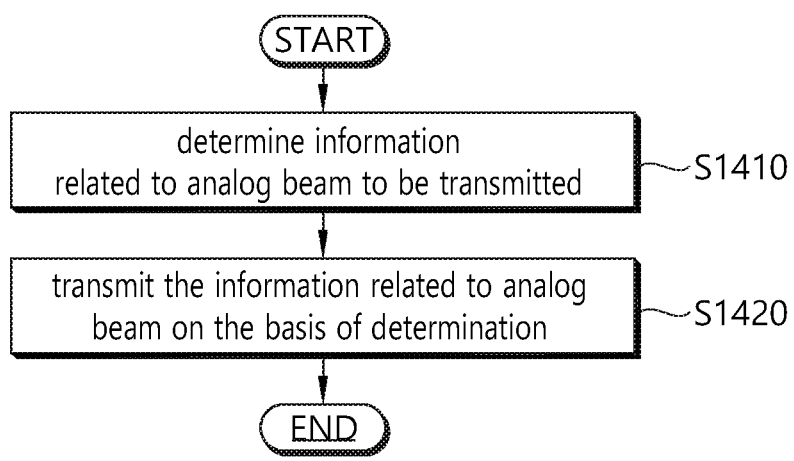
FIG. 14 is a flowchart of a method for transmitting analog beam-related information according to an embodiment of the present invention.

FIG. 11 described above illustrates an example in which PDSCH 1 transmitted to UE 1 and PDSCH 2 transmitted to UE 2 are spatial division multiplexed (SDM-ed). In contrast, as illustrated in FIG. 14, the PDSCH1 transmitted to the UE1 and the PDSCH2 transmitted to the UE2 may be FDM-ed and transmitted.

Among a scheme of serving one region using all the antenna ports and a scheme of serving several regions by dividing antenna ports, a preferred scheme is changed according to a RANK and MCS for serving a UE to maximize cell throughput. Also, a preferred scheme may be changed depending on the amount of data to be transmitted to each UE.

The BS calculates a cell throughput or a scheduling metric which may be obtained when one region is served using all the antenna ports and calculates a cell throughput or a scheduling metric which may be obtained when two regions are served by dividing antenna ports. The BS compares the cell throughputs or the scheduling metrics which may be obtained through the respective schemes and select a final transmission scheme. As a result, the number of antenna ports participating in the PDSCH transmission SF-by-SF is changed. CSI feedback from the UE is required in order for the BS to calculate transmission MCSs of the PDSCH according to the number of antenna ports and reflect the calculated transmission MCSs in a scheduling algorithm.

<Phase Noise>

Jitter on a time axis is defined as phase noise on a frequency axis. The phase noise randomly changes a phase of a reception signal of the time axis as follows.

$$r_n = s_n e^{j\phi_n} \qquad \text{[Equation 1]}$$
$$\text{where } s_n = \sum_{k=0}^{N-1} d_k e^{j2\pi \frac{kn}{N}}$$

In the above equation, $r_n$, $s_n$, $d_k$, $\phi_n$ represent a reception signal, a time axis signal, a frequency axis signal, and a phase rotation value due to phase noise, respectively. When the reception signal undergoes a discrete Fourier transform (DFT), it may be expressed as follows.

$$y_k = d_k \frac{1}{N}\sum_{n=0}^{N-1} e^{j\phi_n} + \frac{1}{N}\sum_{\substack{t=0 \\ t \neq k}}^{N-1} d_t \sum_{n=0}^{N-1} e^{j\phi_n} e^{j2\pi(t-k)m/N} \qquad \text{[Equation 2]}$$

In the above equations, $$\frac{1}{N}\sum_{n=0}^{N-1} e^{j\phi_n}, \frac{1}{N}\sum_{\substack{t=0 \\ t \neq k}}^{N-1} d_t \sum_{n=0}^{N-1} e^{j\phi_n} e^{j2\pi(t-k)m/N},$$

represent a common phase error (CPE) and an ICI, respectively. Here, as correlation between the phase noises is greater, the CPE has a larger value.

<PCRS (Phase Compensation Reference Signal) Embodiment>

Figure 13:
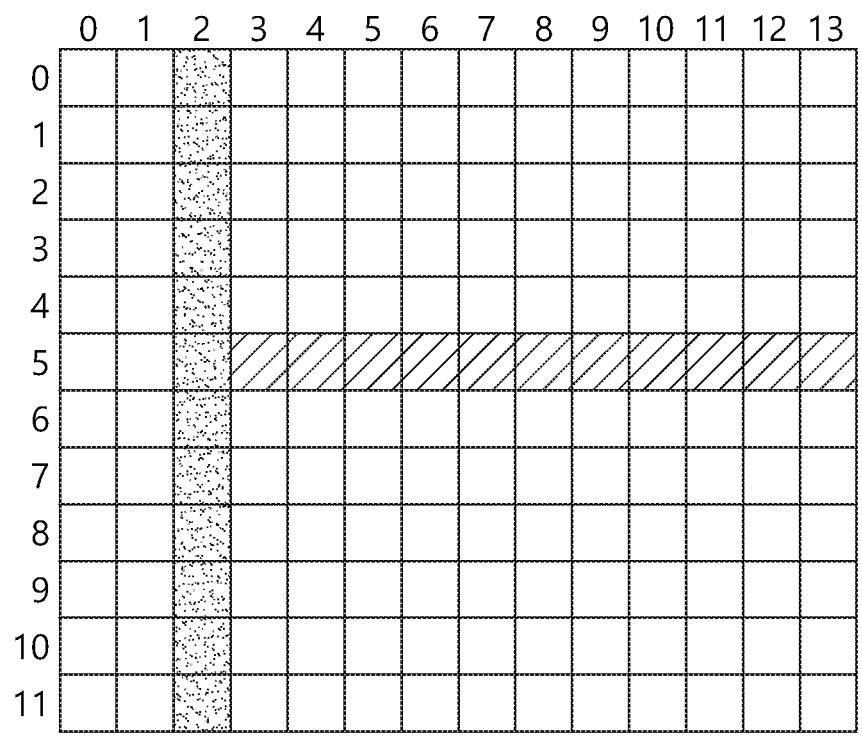
FIG. 13 schematically illustrates an example of a PCRS.

FIG. 13 schematically illustrates an example of a PCRS.

In FIG. 13, a PCRS for port 0 is defined in a fifth subcarrier. The PCRS is successively defined in the time axis and thus a phase difference between different time-axis OFDM symbols may be estimated. The remainder excluding demodulation reference signals (DMRS) and the PCRS represents a general PDSCH or a PDCCH.

Hereinafter, the present invention will be described.

As described above, the analog beam may be directional. In this context, when a specific base station (BS) (or a UE) performs analog beam transmission and reception in the same direction with another BS (or UE), the BS (or UE) is likely to be subjected to high interference by the other BS (or UE). Thus, the specific BS (or a UE) needs to know information regarding an analog beam at another BS (or UE) (in order to reduce interference caused by analog beam transmission and reception performed by the other base station (or UE)).

However, since the BS and the UE in the related art wireless communication technology do not perform wireless communication on the basis of the analog beam (or analog beamforming), the BS (or the UE) in the related art wireless communication technology does not exchange information regarding the analog beam with the other BS (or UE). Thus, the BS (or UE) in the related art has performs communication on the basis of its own analog beam, regardless of whether or not the other BS (or UE) performs communication on the basis of what type of analog beam, and as a result, communication on the basis of the analog beam of the BS (or the UE) in the related art is interfered with by the communication on the basis of the analog beam of the other BS (or the UE).

Therefore, the present invention proposes a method for preventing radio interference from another entity (e.g., a BS, a UE, etc.) by allowing BSs (or UEs, or between a UE and a BS) to exchange information regarding an analog beam. Also, the present invention proposes references for exchanging information regarding which analog beam is to be exchanged between BSs (or between UEs or between a UE and a BS). Thus, in the present invention, when the BS (or UE) performs wireless communication on the basis of an analog beam, the BS (or UE) may not be less interfered with by another BS (or UE), and thus, overall efficiency of the wireless communication system is increased.

The proposed methods below propose methods for effectively mitigating (various types of) interference in case (A) where BSs for (dynamically) changing the radio resource use according to a load state and/or in case (B) where BSs performing wireless communication on the basis of (a plurality of) analog beams are present. In the present invention, wording "analog beam" may be extendedly interpreted as a "reference signal resource (interworking with a beam (index)) (e.g., antenna port, layer index, (time/frequency) resource pattern, etc.) (index)" and/or "(virtual) cell (identifier (/index))".

Here, the (corresponding) interference type may be (A) interference (DTU_IFTYPE) from a downlink signal transmission of another (adjacent) BS when a specific BS receives an uplink signal (transmitted from a UE), and/or (B) interference (UTU_IFTYPE) from an uplink signal transmitted from a UE of another (adjacent) BS when the specific BS receives an uplink signal, and/or (C) interference (UTD_IFTYPE) from an uplink signal transmitted from a US of the other (adjacent) BS when a UE of the specific BS receives a downlink signal, and/or (D) interference (DTD_IFTYPE) from a downlink signal transmission of the other (adjacent) BS when the UE of the specific BS receives a downlink signal.

Here, for example, for convenience of explanation, the cells and UEs causing various types of interference (e.g., DTU_IFTYPE, UTU_IFTYPE, UTD_IFTYPE, DTD_IFTYPE) are referred to as "AGGRESSOR ENTITY", while the corresponding interfered cell (/UE) is referred to as "VICTIM ENTITY".

Here, for example, the term "BS" (used in the present invention) may be interpreted as "(physic (/virtual) cell" and/or "TRP (TRANSMISSION & RECEPTION POINT)" (and/or "analog beam"), etc. Here, for example, the term "resource use (/direction)" (used in the present invention) may include "uplink or downlink" and/or even "a combination of uplink and downlink (e.g., even where is uplink and where is downlink)".

For example, interference characteristics (e.g., interference intensity/pattern) that the AGGRESSOR ENTITY gives to the VICTIM ENTITY may be different for each transmitted analog beam (aggregation) of the AGGRESSOR ENTITY.

Here, for example, in addition, the characteristics interference made on the VICTIM ENTITY from the AGGRESSOR ENTITY may also be different for each reception analog beam (aggregate) of the VICTIM ENTITY.

Here, for example, among the (plurality of) AGGRESSOR ENTITY-related transmission analog beams, a transmission analog beam whose directionality (partially or completely) overlaps the directionality of the reception analog beam of the VICTIM ENTITY is highly likely to give interference. In other words, among the VICTIM ENTITY-related (multiple) reception analog beams, a reception analog beam whose directionality (partially or completely) overlaps directionality of a transmission analog beam of the AGGRESSOR ENTITY is highly likely to be subjected to relatively high interference.

Here, for example, (A) frequency (/probability) that the AGGRESSOR ENTITY will perform a specific analog beam (direction)-based signal transmission and/or (B) frequency (/probability) that the VICTIM ENTITY performs specific analog beam (direction)-based signal transmission may differ depending on a load state (related to the corresponding (transmission/reception) analog beam) (e.g., the amount of uplink/downlink traffic, the number of (connected) UEs, etc.). In other words, for example, a transmission/reception analog beam with a relatively high load condition has higher frequency(/probability) of being used by the AGGRESSOR/VICTIM ENTITY and higher interference inducement/reception probability (/frequency) as well.

For example, application of radio resource use change operation (FLEXIBLE DUPLEX (FDR)) may be different for (A) each BS and/or (B) each analog beam and/or (C) each time/frequency resource (in the same analog beam).

Here, for example, depending on whether the AGGRESSOR ENTITY performs a specific analog beam (direction)-based FDR operation, the characteristics of interference on the VICTIM ENTITY from the (specific) analog beam (direction) may be different.

Under the interference environment described above, for example, (some of) the following rules may be applied to mitigate (various types of) interference.

Here, for example, (some of) the rules below may be applied limitedly only in an environment of uplink (and/or downlink) communication (and/or FDR operation).

Here, for example, (some of) the following rules may be applied only when communication is performed on an FDD (and/or TDD) band (/spectrum).

Hereinafter, a method for transmitting analog beam-related information according to the present invention will be described with reference to the accompanying drawings.

FIG. 14 is a flowchart of a method for transmitting analog beam-related information according to an embodiment of the present invention.

Referring to FIG. 14, a first entity (a first BS (or a first cell) or a UE) may determine analog beam-related information to be transmitted (S1410). Thereafter, the entity may transmit the analog beam-related information to a second entity on the basis of the determination (S1420). For example, the first entity may be a damaged cell, the second entity may be an interference cell, and the information regarding the analog beam may include information identifying an analog beam of the damaged cell interfered with by the interference cell. For example, the information regarding the analog beam may include at least one of a cell identifier of the damaged cell, resource position information of the damaged cell with respect to the analog beam, load information of the damaged cell with respect to the analog beam, and interference information for each resource of the damaged cell with respect to the analog beam. Also, for example, the first entity may be a damaged cell, the second entity may be an interference cell, and the information regarding the analog beam may include information identifying an analog beam of the interference cell interfering with the damaged cell. Also, for example, the information regarding the analog beam may further include a cell identifier of the interference cell, and resource position information of the interference cell with respect to the analog beam. Also, for example, the first entity is a first cell, the second entity is a second cell, the method may further include receiving a measurement value related to an analog beam for the second cell from a UE, and information regarding the analog beam may be determined on the basis of the measurement value. Also, for example, the first entity may be a first cell, the second entity may be a second cell, the information regarding the analog beam may be analog beam information to which a flexible duplex operation is applied, and the analog beam information to which the flexible duplex operation is applied may include at least one of cell identifier information of the first cell, identifier information of the analog beam to which the flexible duplex operation is applied, and operation information regarding the flexible duplex operation. Also, for example, the first entity may be a first cell, the second entity may be a second cell, the first cell and the second cell use different numerologies, and the information regarding the analog beam may be information regarding flexible duplex. Also, for example, the information regarding the flexible duplex may include at least one of periodicity information, numerology information, information regarding the number of symbols, and direction information. Also, for example, the periodicity information may be information regarding a period in which the information regarding the flexible duplex is repeatedly applied, the numerology information may be information regarding subcarrier spacing for the period, the information regarding the number of symbols may be Information regarding the number of symbols in a basic time unit, and the direction information may be information regarding a transmission direction of each symbol constituting the basic time unit.

Here, specific examples in which the entity (BS (or cell) or UE) determines analog beam-related information to be transmitted and transmits the analog beam-related information regarding the basis of the determination are as follows.

For example, the first entity may be a damaged cell, the second entity may be an interference cell, and the information regarding the analog beam may include information identifying an analog beam of the damaged cell interfered with by the interference cell. For example, the information regarding the analog beam may include at least one of a cell identifier of the damaged cell, resource position information of the damaged cell with respect to the analog beam, load information of the damaged cell with respect to the analog beam, and interference information for each resource of the damaged cell with respect to the analog beam. Also, for example, the first entity may be a damaged cell, the second entity may be an interference cell, and the information regarding the analog beam may include information identifying an analog beam of the interference cell interfering with the damaged cell. Also, for example, the information regarding the analog beam may further include a cell identifier of the interference cell, and resource position information of the interference cell with respect to the analog beam. Also, for example, the first entity is a first cell, the second entity is a second cell, the method may further include receiving a measurement value related to the analog beam for the second cell from a UE, and the information regarding the analog beam may be determined on the basis of the measurement value. Hereinafter, examples thereof will be described in detail.

[Proposed Method #1]

For example, when the VICTIM CELL is subjected to interference with strength (higher than a predetermined threshold value) from the AGGRESSOR CELL (when receiving an uplink signal (transmitted from a UE)) (and/or when communication reliability is reduced (to be lower than a predetermined threshold value) due to interference from the AGGRESSOR CELL), (partial) information below may be provided to the AGGRESSOR CELL through predefined (backhaul) signaling.

Here, for example, a type of interference on the VICTIM CELL (from the AGGRESSOR CELL) may be DTU_IFTYPE and/or UTU_IFTYPE (and/or DTD_IFTYPE and/or UTD_IFTYPE).

Here, for example, the AGGRESSOR CELL receiving the (partial) information below (from the VICTIM CELL) may (A) perform (uplink (/downlink) signal transmission scheduling) using (time/frequency) resource at a position different from AGG_RSC of AGG_BEAM (or VIC_RSC of VIC_BEAM) and/or (B) decrease (transmission) power value when performing (uplink (/downlink) signal transmission is scheduled using (time/frequency) resource at a position different from the AGG_RSC of AGG_BEAM (or VIC_RSC of VIC_BEAM) and/or (C) change (/adjust) a direction of a (transmission) analog beam related to AGG_BEAM (AGG_RSC) and/or (D) offload some (or all of) UEs performing AGG_BEAM (AGG_RSC)-based (uplink (/downlink)) communication to another analog beam (direction) (through an analog beam switching operation) (an effect of lowering AGG_BEAM (AGG_RSC)-based signal transmission performing frequency (/probability)) and/or (E) increase a rate of radio resource for the purpose of uplink (/downlink) (and/or stop application of an FDR operation) when the FDR operation has been applied to AGG_BEAM (AGG_RSC) (or (time/frequency) resource at a position (partially or entirely) overlapping the VIC_RSC of VIC_BEAM) and/or (F) change differently a ratio of resource of uplink or downlink according to an interference type (of AGG_BEAM (AGG_RXC)) (e.g., increase the ratio of resource of uplink (/downlink) when the interference type of AGG_BEAM (AGG_RSC) is DTU_IFTYPE (/UTD_IFTYPE).

Example #1-1

(A) Analog beam (VIC_BEAM) index (/identifier) and/or (B) cell (/UE) (physical) identifier information and/or (C) (analog beam-specific) (time/frequency) resource (VIC_RSC) position information (and/or (analog beam-specific) (traffic) load information (/resource use rate information) and/or interference (strength) level (/transmission power level) information for each (analog beam-specific) (time/frequency) resource), of the VICTIM CELL subjected to interference with strength (higher than a predetermined threshold value) from the AGGRESSOR CELL.

Example #1-2

(A) Analog beam (AGG_BEAM) index (/identifier) information and/or (B) cell (/UE) (physical) identifier information and/or (C) (analog beam-specific) (time/frequency) resource (AGG_RSC) position information, of the AGGRESSOR CELL which exerts interference with strength (higher than a predetermined threshold value) to the VICTIM CELL.

For example, if the AGGRESSOR CELL gives the VICTIM CELL an interference having higher strength (higher than the predetermined threshold) at the time of transmitting an (uplink/downlink) signal, the AGGRESSOR CELL may provide (partial) information below to the VICTIM CELL through predefined (backhaul) signaling.

Here, for example, a type of interference (on the VICTIM CELL) from the AGGRESSOR CELL may be DTU_IFTYPE and/or UTU_IFTYPE (and/or DTD_IFTYPE and/or UTD_IFTYPE).

Here, for example, the VICTIM CELL receiving the (partial) information below (from the AGGRESSOR CELL) may (A) perform (uplink (/downlink) signal transmission scheduling) using (time/frequency) resource at a position different from AGG_RSC of AGG_BEAM (or VIC_RSC of VIC_BEAM) and/or (B) increase (transmission) power value when performing (uplink (/downlink) signal transmission is scheduled using (time/frequency) resource at a position different from the AGG_RSC of AGG_BEAM (or VIC_RSC of VIC_BEAM) and/or (C) change (/adjust) a direction of a (reception (/transmission)) analog beam related to VIC_BEAM (VIC_RSC) and/or (D) offload some (or all of) UEs performing VIC_BEAM (VIC_RSC)-based (uplink (/downlink)) communication to another analog beam (direction) (through an analog beam switching operation) (an effect of lowering VIC_BEAM (VIC_RSC)-based signal transmission performing frequency (/probability)) and/or (E) increase a rate of radio resource for the purpose of downlink (/uplink) (and/or stop application of an FDR operation) when the FDR operation has been applied to AGG_BEAM (AGG_RSC) (or (time/frequency) resource at a position (partially or entirely) overlapping the VIC_RSC of VIC_BEAM) and/or (F) change differently a ratio of resource of uplink or downlink according to an interference type (of AGG_BEAM (AGG_RXC)) (e.g., increase the ratio of resource of downlink (/uplink) when the interference type of AGG_BEAM (AGG_RSC) is DTU_IFTYPE (/UTD_IFTYPE).

Example #1-3

(A) Analog beam (AGG_BEAM) index (/identifier) information and/or (B) Cell (/UE) (physical) identifier information, and/or (C) (analog beam-specific) (time/frequency) resource (AGG_RSC) position information (and/or (analog beam-specific) (traffic) load information (/resource use rate information) and/or (information of interference (strength) level (/transmission power level) for each analog beam-specific) (time/frequency) resource), of the AGGRESSOR CELL which exerts interference on the VICTIM CELL an interference of a high strength (higher than the predetermined threshold).

Example #1-4

(A) Analog beam (VIC_BEAM) index (/identifier) and/or (B) cell (/UE) (physical) identifier information and/or (C) (analog beam-specific) (time/frequency) resource (VIC_RSC) position information, of the VICTIM CELL subjected to interference with strength (higher than the predetermined threshold value) from the AGGRESSOR CELL.

For example, (in the Examples #1-1/2/3/4 described above) the VICTIM CELL (A) may stop VIC_BEAM (VIC_RSC)-based uplink signal reception (/downlink signal transmission) during a predetermined (time) period (MUTE_WIN), perform BEAM REFERENCE SIGNAL RECEIVED POWER (BRSRP) measurement (and/or channel measurement) on (a plurality of) analog beams related to the AGGRESSOR CELL, and subsequently regard the AGG_BEAM (AGG_RSC) which exerts interference with strength (higher than the predetermined threshold value) on the VIC_BEAM (VIC_RSC) as (AGGRESSOR CELL) analog beam having the highest measurement value (thereamong), and/or (B) may be reported a BRSRP measurement value (and/or channel measurement value) (UE_MRPT) regarding (a plurality of) AGGRESSOR CELL-related analog beams from the UE performing VIC_BEAM (VIC_RSC)-based communication and subsequently regard the AGG_BEAM (AGG_RSC) which exerts interference with strength (higher than the predetermined threshold value) on the VIC_BEAM (VIC_RSC) as (AGGRESSOR CELL) analog beam having the highest measurement value (thereamong).

Here, for example, when this rule is applied, the VICTIM CELL may (implicitly) infer (or derive) (Example #1-3) information although the VICTIM CELL receives only the (EXAMPLE #1-4) information from the AGGRESSOR CELL.

For example, when the AGGRESSOR CELL performs AGG_BEAM (AGG_RSC)-based (uplink/downlink)) signal transmission (in the Examples #1-1/2/3/4 described above), the AGGRESSOR CELL may (A) stop the AGG_BEAM (AGG_RSC)-based uplink signal reception (/downlink signal transmission) during a predetermined (time) period (MUTE_WIN), perform the BRSRP measurement (and/or channel measurement) on the (plurality of) VICTIM CELL-related analog beam, and subsequently regard the VIC_BEAM (VIC_RSC) which exerts interference with strength (higher than the predetermined threshold value) as the (VICTIM CELL) analog beam having the highest measurement value (thereamong) and/or (B) may be reported the BRSRP measurement value (and/or channel measurement value) regarding the (plurality of) VICTIM CELL-related analog beams (UE_MRPT) and subsequently regard the VIC_BEAM (VIC_RSC) which exerts interference with strength (higher than the predetermined threshold value) as the (VICTIM CELL) analog beam having the highest measurement value (thereamong).

Here, for example, when such a rule is applied, the AGGRESSOR CELL may (implicitly) infer (or derive) the (Example #1-1) information although only the (Example #1-2) information is received from the VICTIM CELL.

For example, when the MUTE_WIN includes a downlink (time/frequency) resource in which RADIO RESOURCE MANAGEMENT (RRM) (and/or CHANNEL STATE INFORMATION (CSI)) measurement-related reference signal is transmitted (and/or an uplink (time/frequency) resource in which SOUNDING REFERENCE SIGNAL (SRS) (and/or uplink channel) is transmitted, the cell may provide corresponding information (including MUTE_WIN configuration information) to the UE (through predefined signaling) so that the UE may not perform (corresponding) measurement (and/or uplink signal (/channel) transmission) operation in the MUTE_WIN.

For example, the cell may (a)periodically trigger the UE_MRPT report related to the INTER-CELL INTERFERENCE COORDINATION (ICIC) operation to the UE through predefined (physical (/higher layer)) signaling (e.g., DCI FORMAT).

Also, for example, the first entity is a first cell and the second entity is a second cell, the information regarding the analog beam is analog beam information to which a flexible duplex operation is applied, and the flexible duplex operation is applied The analog beam information may include at least one of cell identifier information of the first cell, analog beam identifier information to which the flexible duplex operation is applied, and operation information related to the flexible sub-duplex operation. Hereinafter, this will be described in more detail.

Also, for example, the first entity may be a first cell, the second entity may be a second cell, the information regarding the analog beam may be analog beam information to which a flexible duplex operation is applied, and the analog beam information to which the flexible duplex operation is applied may include at least one of cell identifier information of the first cell, identifier information of the analog beam to which the flexible duplex operation is applied, and operation information regarding the flexible duplex operation. This will be described in detail hereinafter.

[Proposed Method #2]

For example, through pre-defined (backhaul) signaling, a specific cell may provide, to another cell (adjacent thereto), (A) cell (physical) identifier information (thereof) and/or (B) analog beam (FDR_AGGBEAM) index (/identifier) information to which an FDR operation is applied and/or (C) (analog beam-specific) (time/frequency) resource use information and/or (D) (analog beam-specific) FDR operation-related (operation) information (e.g., FDR operation period, (time/frequency) resource position to which FDR operation is applied (FDR_AGGRSC), a resource unit on which the FDR operation is performed), and the like.

Here, for example, a cell receiving corresponding information (from the specific cell) may recognize (A) analog beam (FDR_VICBEAM) index (/identifier) receiving high interference (e.g., DTU_IFTYPE, UTD_IFTYPE) of different characteristics (from the existing case) from the FDR_AGGBEAM (FDR_AGGRSC) and/or (analog beam-specific) (time/frequency) resource position (FDR_VICRSC) on the basis of the BRSRP measurement value (and/or the channel measurement value) regarding (a plurality of) analog beams related to a specific cell (directly performed by itself) during a period reported from the UE (performing communication therewith) (or during predetermined (time) period).

Here, for example, regarding the FDR_AGGBEAM (FDR_AGGRSC), a (reception) analog beam which has obtained the highest measurement value (and/or an analog beam to which a UE which has reported the highest measurement value belongs) may be regarded as the FDR_VICBEAM (FDR_VICRSC).

Here, for example, the (cell) may additionally set (/signal) an (analog beam-specific) interference measurement resource for measuring an interference amount (/pattern) received from the FDR_VICBEAM (FDR_AGGRSC) to the UE and an analog beam for which the highest (interference) measurement value was reported may be regarded as FDR_VICBEAM (FDR_VICRSC).

Here, for example, through predefined (higher (/physical) layer) signaling, the (cell) allow the UE to separate interference averaging operation (and/or perform (resource-specific) limited (CSI) measurement operation) between (A) FDR_VICBEAM (FDR_VICRSC) (RSCTYPE#A) and (B) the remaining analog beam (related (time/frequency) resource) (and/or remaining (time/frequency)resource) excluding FDR_VICRSC on FDR_VICBEAM) (RSCTYPE#B).

Here, for example, the UE may (limitedly) perform the interference averaging operation (and/or the (resource-specific) limited (CSI) measurement operation) regarding the RSCTYPE#A/B only when data (and/or reference signal) is actually received through the corresponding resource (region).

For example, if a serving cell (actually) transmits data (and/or reference signal) to a specific UE using only an analog beam (and/or (frequency/time) resource) guaranteed in (external) interference of similar (or the same) characteristics, the UE may perform the predetermined (/signaled) interference measurement resource (and/or reference signal)-based interference averaging operation (and/or (resource-specific) limited (CSI) measurement operation) only when the (actual) data (and/or reference signal)) is received. For example, if the UE is able to measure (external) interference amount (/pattern) received for each analog beam (through predetermined (/signaled) (analog beam-specific) interference measurement resource), the UE may report (each) interference measurement value, as well as a higher K number of BRSRP measurement values, to the serving cell.

Here, for example, (finally reported) higher K analog beam indices (/identifiers) may be determined on the basis of the ratio between the BRSRP measurement values and the interference measurement value. Here, for example, when such a rule is applied, the probability that an analog beam index (/identifier) subjected to high interference (from the outside) is used for communication may be lowered.

Also, for example, the first entity is a first cell and the second entity is a second cell, the method may further include receiving a measurement related to the analog beam for the second cell from the UE, and the information regarding the analog beam may be determined on the basis of the measured value. Hereinafter, specific examples thereof will be described.

[Proposed Method #3]

For example, when a serving cell determines an optimal analog beam index (/identifier) (and/or a BRS ID) (to be used for communication) related to a specific UE, in order to consider the amount of interference that may be made when (downlink (/uplink)) data communication is actually performed (thereafter), the (corresponding) UE may additionally report an RSSI measurement value (and/or RSRQ measurement value (e.g., a value of a ratio between the BRSRP measurement value and the RSSI measurement value)) (in addition to the BRSRP measurement value) for each analog beam (and/or each BRS ID).

Here, for example, the RSSI measurement related to a specific analog beam (and/or BRS ID) may be performed on (A) a (symbol) resource (RSSI_SYM) on which the BRS of the associated identifier (ID) is transmitted (e.g., a remaining (energy) value obtained by removing BRS (sequence (/energy)) may be reported as the RSSI measurement value) and/or (B) on a predetermined (/signaled) (symbol) resource (RSSI_SYM) in which a reference signal (rather than BRRS) of a specific antenna port is transmitted) of a (time) interval in which a corresponding (specific) analog beam (and/or BRS ID)-based (downlink (/uplink)) data communication is performed.

Here, for example, in order to allow external interference (to be exerted when actual (downlink (/uplink)) data communication is performed) to be (effectively) reflected on the RSSI_SYM in which RSSI measurement is performed, RSSI_SYM positions of different cells may be set not to overlap as possible.

Here, for example, through predefined (backhaul) signaling, a specific cell may share its (or preferred) RSSI_SYM position information with another (neighboring) cell. For example, by setting transmission periods of the reference signal (e.g., BRS) used for analog beam measurement to be different between (some) cells, the corresponding (analog beam) measurement operation may be performed effectively.

Here, for example, (additionally) between cells, (A) time (/frequency) resource position information for transmitting an analog beam measurement-related reference signal of each cell and/or (B) a time (/frequency) resource position information for performing another cell-related analog beam measurement operation (after each cell stops a preferred or downlink transmission (/uplink reception) operation (or a UE performing communication with each cell stops (preferred or downlink reception (/uplink transmission) operation)) may be exchanged (through backhaul signaling).

[Proposed Method #4]

For example, (by exchanging related information through backhaul signaling), pairing of an analog beam index (/identifier) (HIF_PAIRBEAM) exchanging (relatively) high interference between cells, and/or an analog beam index (/identifier) (LIF_PAIRBEAM) exchanging (relatively) low interference), and/or an analog beam index (/identifier) (MIF_PAIRBEAM) exchanging an interference smaller than a predetermined (allowable) threshold value may be performed.

Here, for example, (A) communication on the HIF_PAIRBEAM may be performed only for the same (time/frequency) resource use (/direction) previously set (/signaled) (additionally) between cells, and/or (B) (meanwhile) communication on the LIF_PAIRBEAM may be performed for independent (or different) (time/frequency) resource use (/direction) between cells, and/or (C) communication on the MIF_PAIRBEAM may be performed for independent (or different) (time/frequency) resource use (/direction) between cells, while applying interference mitigation rule (/technique) previously set (/signaled) additionally between cells (e.g., downlink (/uplink)) transmission power reduction and/or a designated (time/frequency) resource use (/direction) is used on a partial important resource and an independent (or different) (time/frequency) resource use (/direction) is used on the other resource).

Here, for example, the rule may be interpreted such that (time/frequency) resource uses (/directions) are matched only when analog beam indices (/identifiers) exchanging (relatively) high interference between different cells are simultaneously (actually) used.

Here, for example, in this operation, the analog beam index (/identifier) in the above description, the degree of freedom of setting the corresponding (time/frequency) resource use (/direction), and/or whether to apply the interference mitigation rule (/technique) may be separately determined depending on a time interval.

Here, for example, (for the purposes of description) it is considered (/assumed) that a specific cell 1 uses a specific analog beam 1 in a time interval 1 and another analog beam 2 in a time interval 2.

Here, for example, the cell 1 may then follow (some of) the rules below by exchanging information with a neighboring cell 2 (through backhaul signaling).

For example, it may be configured such that, in the time interval 1, an analog beam A1 of cell 2, which is represented by HIF_PAIRBEAM, is determined for analog beam 1 of the cell 1, and when the cell 2 uses the analog beam A1, a specific (time/frequency) resource use (/direction) is used together with the cell 2, whereas an analog beam B1 of the cell 2, which is represented by LIF_PAIRBEAM, is determined together for the analog beam 1 of the cell 1, and when the cell 2 uses the analog beam B1, a certain (time/frequency) resource use (/direction) is used.

For example, it may be configured such that, in the time interval 2, the analog beam used by the cell 1 changes to 2, and when the cell 2 is used in this case, the analog beam represented by HIF_PAIRBEAM and LIF_PAIRBEAM is different. That is, for example, in the time interval 2, the analog beam A2 of the cell 2, which is represented by HIF_PAIRBEAM, is determined for the analog beam 2 of the cell 1, and when the cell 2 uses the analog beam A2, it uses a specific (time/frequency) resource use (/direction) together with the cell 2, whereas an analog beam B2 of the cell 2, which is represented by LIF_PAIRBEAM, is determined for the analog beam 2 of the cell 1, and when the cell 2 uses the analog beam B2, it uses a certain (time/frequency) resource use (/direction).

For example, in the embodiment, the cell 2 may perform an appropriate operation depending on a traffic load actually applied to its analog beam. Here, it is assumed that, for example, in the place of the cell 2, the analog beam A1 and the analog beam B2 are the same, and also, the analog beam B1 and the analog beam A2 are the same (for the purposes of description).

Here, for example, if the UE connected to the cell 2 concentrates on the analog beam A1 (=B2), the cell 2 may use the analog beam A1 (=B2) in both time intervals 1 and 2, and here, since the corresponding beam is the HIF_PAIRBEAM in the time interval 1, only a designated (time/frequency) resource use (/direction) may be used, and since the corresponding beam is the LIF_PAIRBEAM in the time interval 2, a (time/frequency) resource use (/direction), which is optimal for a given situation, may be selected without restrictions.

[Proposed Method #5]

For example, the UE may report, when performing an uplink communication based on which PMI value (IFPMI) (from a serving cell), a (relatively) high interference is exerted on a specific (reception) analog beam of an adjacent cell (or BRS ID).

Here, for example, channel measurement for a specific analog beam (or BRS ID) of a neighboring cell may be performed on the basis of the BRS of an associated identifier (ID) (and/or a predetermined (/signaled) reference signal transmitted when (downlink (/uplink)) data communication based on the corresponding (specific) analog beam (and/or BRS ID)).

Here, for example, in order to reduce the IFPMI reporting overhead (and/or search complexity) of the UE, a limited number of search candidate PMI value information may be provided through predefined signaling.

For example, an FDR operation may be implemented such that only a (maximum) transmission power value allowed on a spectrum (/band) is limited to change a radio resource use, without discriminating TDD/FDD spectrums.

For example, when carrier aggregation (CA) and a CROSS-CARRIER SCHEDULING (CCS) are set between a MACRO cell (e.g., PCELL) (having wide communication coverage) and a PICO cell (e.g., SCELL) having short communication coverage), radio resource uses for a specific (sub)band of an FDR MARCO CELL (e.g., PCELL) may (all) be set (/signaled) only in downlink (and/or uplink) to effectively support a CCS operation for a (FDR) PICO CELL (e.g., SCELL) (and/or ACK/NACK reporting operation).

[Proposed Method #6]

For example, assuming that a list of the HIF_PAIRBEAM (and/or LIF_PAIRBEAM and/or MIF_PAIRBEAM) is formed through application of (some of) the proposed methods, each cell may provide information regarding (frequency/time) resource for an analog beam to be transmitted with a high (transmission) power value (for each analog beam) (and/or (corresponding) analog beam index (/identifier) information) and/or information regarding (corresponding) transmission power value) (to another cell (through backhaul signaling)).

Here, for example, in the case of the VICTIM CELL, protection may be performed by scheduling another reception (/transmission) analog beam in a direction in which interference is low in the corresponding (frequency/time) resource.

Here, for example, (conversely), the VICTIM CELL may provide a list of reception (/transmission) analog beams desired to be protected in each neighboring cell and/or a list of transmission analog beams which exert high interference (on the VICTIM CELL itself) or which are desired to be limited in use)(/scheduling) on a specific resource (through backhaul signaling). Here, when such a rule is applied, the VICTIM CELL may protect its transmission analog beam (from the AGGRESSOR CELL) (and/or a reception analog beam of a UE performing communication with the VICTIM CELL) and/or a reception analog beam.

In the above-described example, the exchange of information between cells may be (A) a direct exchange of information between cells which interfere with each other and/or (B) information determined and transmitted from a device which controls operations of several cells.

Here, for example, in the former case, it may be a form of request information for a kind of inter-cell cooperation, while, in the latter case, it may be a form of an instruction to follow the information.

For example, in order to ensure efficient coexistence between an LTE system (which performs communication on an adjacent and/or the same channel) and an NR system (which performs FLEXIBLE DUPLEX operation, for example), the following operation (/rule) may be applied.

<Rule for Coexistence Between LTE System (which Performs Communication on Adjacent and/or Same Channel) and NR System (which Performs FLEXIBLE DUPLEX Operation, for Example)>

Regarding cross-link interference mitigation, a common framework for cross-link interference mitigation for both paired and unpaired spectrums needs to be provided. In this context, there is a need to somehow do cross-link interference management for coexistence between LTE and NR together with a flexible duplex operation.

If the NR and LTE networks are located in the same or adjacent frequency bands, interference due to flexible duplex operation of the NR network must be handled by an appropriate interference mitigation mechanism allowing coexistence between NR and LTE.

In order to solve the interference problem, measurement/sensing/detection by NR gNB and/or UE and exchange of coordination information between NR and LTE through backhaul/public signaling may be considered.

Here, for coexistence between NR and LTE, an adjustment information-based ICIC may be devised.

First, the NR may provide the LED with information regarding resource guaranteeing a low inter-link interference level for the LTE. In particular, the resource here may be related to essential LTE channels/signals having high priority that need to be protected by the NR. Here, (1) this may be determined by reception of auxiliary information (e.g., TDD UL/DL configuration, control channel region, etc.) or a request from LTE. Or, (2) it may be determined by detecting essential information by the NR itself.

In order to enable low cross-link interference, several methods may also be considered. For example, alignment of DL/UL use between NR and LTE may be considered. Or, a flexible duplex operation in the resource may have a fault. Regarding resource to be protected by NR, beam avoidance or power reduction (or blanking of resource by not scheduling) may also be considered. In particular, in the adjacent channel case, frequency selection for resource that must be protected by NR may help mitigate interference leakage.

Second, regarding the other remaining resource, not the resource having high priority, interference which is relatively high and changes over time may be allowed for the NR, and thus, it may be considered that some approaches such as beam avoidance and power/MCS adaptation on the LTE side may handle interference from the NR. When considering high backhaul latency, coordination based on information exchange may not provide a sufficient gain for the flexible duplex operation of the NR. Thus, if the NR gNB and/or UE recognizes the resource utilization (or presence) of LTE by sensing/detecting/measuring, opportunistic resource utilization of the NR that does not cause cross-link interference to the LTE may be considered.

Referring back to FIG. 14, for example, networks for performing communication in different directions on adjacent channels, and in order to mitigate interference therebetween, "(UE) BANDWIDTH ADAPTATION" may be set (/signaled) for each (predetermined (/signaled) subframe.

Here, for example, in a (downlink) subframe aggregation (partially or entirely) overlapping subframes in which the (existing) (LTE) system on an adjacent channel performs uplink communication (and/or subframes used for uplink use), another (NR) system (performing FLEXIBLE DUPLEX operation) may set (/signal) "(UE) BANDWIDTH" related to downlink communication to be small, thus mitigating interference on the (existing) (LTE) system.

Here, for example, when the corresponding rule is applied, downlink communication (e.g., "data reception" and/or "CSI measurement" and/or "RRM measurement", etc.)-related "(UE) BANDWIDTH" may be interpreted to be different between (different (NR) system-related) (some) subframe aggregations.

Here, for example, in the (uplink) subframe aggregation (partially or entirely) overlapping subframes in which the (existing) (LTE) system on an adjacent channel performs downlink communication (and/or subframes used for downlink use), another (NR) system (performing FLEXIBLE DUPLEX operation) may set (/signal) "(UE) BANDWIDTH" related to uplink communication to be small, thus mitigating interference on the (existing) (LTE) system.

Here, for example, when the corresponding rule is applied, uplink communication (e.g., "data transmission" and/or "SRS transmission", etc.)-related "(UE) BANDWIDTH" may be interpreted to be different between (different (NR) system-related) (some) subframe aggregations. Here, for example, in the (uplink) subframe aggregation (partially or entirely) overlapping the subframes in which the (NR) system (performing FLEXIBLE DUPLEX operation) on the adjacent channel performs downlink communication (and/or subframes used for downlink use), the (existing) (LTE) system may set (/signal) uplink communication-related "(UE) BANDWIDTH" to be small, thus mitigating interference from the (NR) system.

Here, for example, in the (downlink) subframe aggregation (partially or entirely) overlapping the subframes in which the (NR) system (performing FLEXIBLE DUPLEX operation) on the adjacent channel performs uplink communication (and/or subframes used for uplink use), the (existing) (LTE) system may set (/signal) downlink communication-related "(UE) BANDWIDTH" to be small, thus mitigating interference from the (NR) system.

Here, for example, when (one) system bandwidth is divided into/operated as a plurality of subbands (in consideration of limited capability of the UE), whether to apply "(UE) BANDWIDTH ADAPTATION" described above and/or "(UE) BANDWIDTH" adjustment (/reduction), and the like, may be differently set (/signaled) (for example, as the subband is positioned to be close to the edge of the system bandwidth, the probability of applying "(UE) BANDWIDTH ADAPTATION" and/or the probability of "(UE) BANDWIDTH" adjustment (/reduction) may be increased (because it causes strong interference on the adjacent channel)).

Here, for example, application of the "(UE) BANDWIDTH ADAPTATION" described above may have a form of "UE-SPECIFIC" (and/or "CELL(/(SUB)BAND)-SPECIFIC").

Also, for example, the first entity may be a first cell, the second entity may be a second cell, the first cell and the second cell use different numerologies, and the information regarding the analog beam may be information regarding flexible duplex. Also, for example, the information regarding the flexible duplex may include at least one of periodicity information, numerology information, information regarding the number of symbols, and direction information. Also, for example, the periodicity information may be information regarding a period in which the information regarding the flexible duplex is repeatedly applied, the numerology information may be information regarding subcarrier spacing for the period, the information regarding the number of symbols may be Information regarding the number of symbols in a basic time unit, and the direction information may be information regarding a transmission direction of each symbol constituting the basic time unit. Hereinafter, a specific example thereof will be described.

For example, a method for efficiently supporting the FLEXIBLE DUPLEX operation by allowing information between BSs to be exchanged will be described in detail below.

<Method of Supporting FLEXIBLE DUPLEX Operation by Exchanging Information Between BSs>

Regarding cross-link interference mitigation, UE-UE measurement and reporting and TRP-TRP measurement may be considered.

In addition, for example, the NR may support providing an intended DL/UL transmission direction configuration among the gNBs through backhaul signaling for the purpose of cross-link interference mitigation.

For example, when each cell uses different numerologies, at least one (or all) of the following information may be included in the 'intended DL/UL transmission direction configuration'. The primary purpose of providing the following information is to provide information regarding how to manage the duplex flexibility operation, and the following (pieces of) information may be used to mitigate or avoid cross-link interference.

In more detail, the (pieces of) information that may be included in the 'intended DL/UL transmission direction configuration' are as follows.

Periodicity information (repPeriod): This information may refer to that 'intended DL/UL transmission direction configuration' is repeatedly applied on the basis of the periodicity information. That is, this information may indicate a period at which the 'intended DL/UL transmission direction configuration' is repeatedly applied.

Numerology information (e.g., subcarrier spacing, CP type, if necessary, etc.); numerConfig): This information may be applied to the total number of symbols in the repPeriod. For example, when information regarding the subcarrier spacing is provided, the number of symbols configured in one period is reversely operated using the value of subcarrier spacing to derive the number of symbols according to the value of subcarrier spacing.

The number of symbols within a basic time unit (e.g., slot, numSymBasicTimeUnit)

Direction information (direcInfo): This information may indicate a transmission direction (or use) of each symbol constituting a basic time unit (BSU). In other words, direcInfo may be signaled on each BTU basic unit.

A method of recognizing and managing a duplex flexible operation on the basis of the 'intended DL/UL transmission direction configuration' described above will be described with reference to the accompanying drawings.

Figure 15:
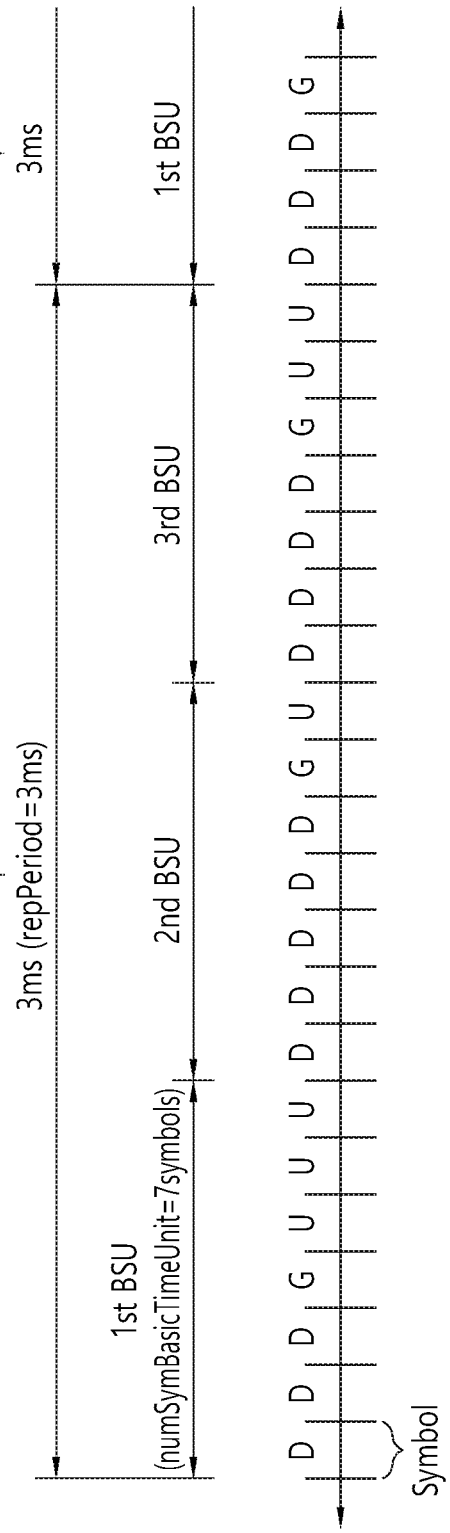
FIG. 15 schematically illustrates an example of a method of recognizing a duplex flexible operation on the basis of the 'intended DL/UL transmission direction configuration' information.

FIG. 15 schematically illustrates an example of a method of recognizing a duplex flexible operation on the basis of the 'intended DL/UL transmission direction configuration' information.

According to FIG. 15, it is assumed that "repPeriod=3 ms", "numerConfig=30 KHz (i.e., the number of symbols within repPeriod is 21)", "numSymBasicTimeUnit=7symbols", "direcInfo for 1st BTU=DDDGUUU", "direcInfo for 2nd BTU=DDDDDGU", and "direcInfo for 3rd BTU=DDDDGUU". Here, "D", "U", and "G" may refer to "DL", "UL", and "GP (Guard Period)", respectively.

In addition, in the LTE system, a resource having a fixed DL/UL TX direction may always exist although a TDD eIMTA operation is applied. Thus, from a particular gNB perspective, a region of resources of a neighboring gNB may be considered as a region without cross-link interference, which may be used for transmission of essential channels/signals (e.g., control/broadcast channels, synchronization signals, etc.) In this manner, when information regarding resources (e.g., resources with fixed DL/UL TX direction) for the fixed DL/UL transmission direction is additionally exchanged among the gNBs via backhaul signaling, the information may be useful for planning scheduling, essential channel/signal transmission/protection, and cross-link interference management.

The method of supporting the FLEXIBLE DUPLEX operation by exchanging information between the BSs described above is summarized as follows.

The 'intended DL/UL transmission direction configuration' may include periodicity information, numerology information, number of symbols in the basic time unit, and direction information.

For example, for essential channel/signal protection/ transmission, exchange of the Indicator of resources with fixed DL/UL TX direction between gNBs through backhaul signaling may be supported in the NR.

Referring back to FIG. 14, for example, in the present invention, the proposed method based on the 3GPP LTE system has been described for the purposes of description, but coverage of the system to which the proposed method is applied may be extended to any other system than the 3GPP LTE system.

For example, the proposed methods of the present invention may be extendedly applied to (any) case in which the FDR operation is implemented in a TDM form (for example, (resource) use (/direction) may be changed for each predetermined (/signaled) time resource unit) and/or in an FDM form (for example, (resource) use (/direction) may be changed for each predetermined (signaled) frequency resource unit).

In addition, it is obvious that examples of the proposed methods described above may also be included as one of the implementation methods of the present invention, and thus, may be regarded as a kind of proposed methods. In addition, the proposed methods described above may be implemented independently or may be implemented in the form of a combination (or merge) of some of the proposed methods.

For example, the embodiments of the present invention will be described from a view point that the damaged cell transmits information related to an analog beam to an interference cell on the basis of pairing process' (or (the interference cell transmits information related to an analog beam to the damaged cell on the basis of the pairing process) with reference to the accompanying drawings.

Figure 16:
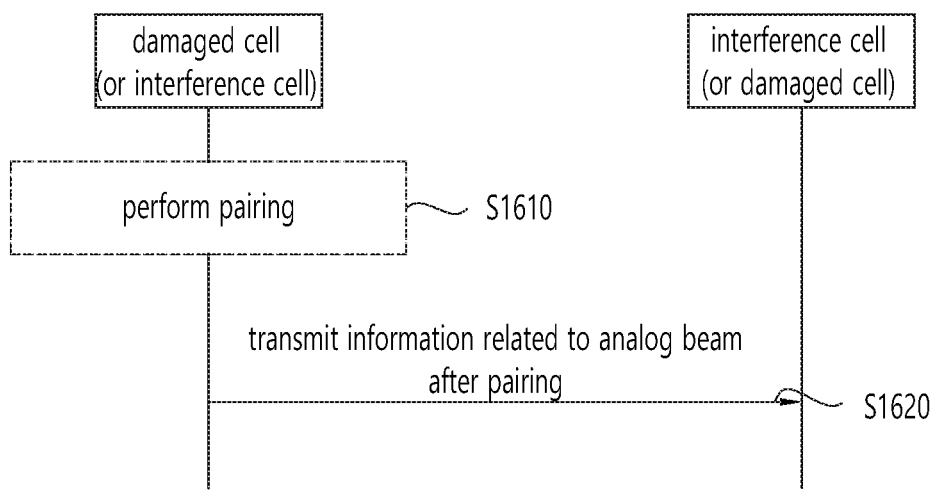
FIG. 16 is a flowchart of a method of transmitting analog beam-related information according to another embodiment of the present invention.

FIG. 16 is a flowchart of a method of transmitting analog beam-related information according to another embodiment of the present invention.

Referring to FIG. 16, a damaged cell (or an interference cell) may perform a pairing process (S1610). Here, the damaged cell may refer to the VICTIM CELL described above, and an inflector cell may refer to the AGGRESSOR CELL described above.

The pairing process here may refer to a process in which the damaged cell determines an analog beam of the interference cell that affects the damaged cell as described above. For example, the VICTIM CELL (in the Examples #1-1/2/ 3/4) described above) may regard an analog beam that exerts interference of strength (higher than a predetermined threshold value) on the VIC_BEAM (VIC_RSC), as the AGG_ BEAM (AGG_RSC). Or, as described above, the pairing process may refer to a process in which the inflictor cell determines an analog beam of the damaged cell which is affected by the inflictor cell. For example, (in the (Examples #1-1/2/3/4) described above), when performing (uplink (/downlink)) signal transmission based on the AGG_BEAM (AGG_RSC), the AGGRESSOR CELL may regard an analog beam which exerts interference having strength (higher than the predetermined threshold value) as the VIC_BEAM (VIC_RSC). A specific example of the pairing process here is the same as described above, and thus, redundant descriptions of the contents described above (for example, FIG. 14) will be omitted hereinafter.

Thereafter, the damaged cell (or interference cell) transmits information related to the analog beam (S1620). For example, the information regarding the analog beam may include information identifying the analog beam of the damaged cell which is interfered with by the interference cell. For example, the information regarding the analog beam may include at least one of a cell identifier of the damaged cell, resource position information of the damaged cell with respect to the analog beam, load information of the damaged cell with respect to the analog beam, and information of interference information for each resource with respect to the analog beam of the damaged cell. Also, for example, the information regarding the analog beam may include information identifying the analog beam of the interference cell which exerts interference on the damaged cell. Also, for example, the information regarding the analog beam may further include a cell identifier of the interference cell and resource position information of the interference cell on the analog beam. Also, for example, the method may further include receiving from the UE a measurement related to the analog beam for the second cell, and information regarding the analog beam may be determined on the basis of the measurement.

Here, as described above, when the VICTIM CELL is subjected to interference with strength (higher than a predetermined threshold value) from the AGGRESSOR CELL (when receiving an uplink signal (transmitted from a UE)) (and/or when communication reliability is reduced (to be lower than a predetermined threshold value) due to interference from the AGGRESSOR CELL), (partial) information below may be provided to the AGGRESSOR CELL through predefined (backhaul) signaling.

Alternatively, as described above, for example, if the AGGRESSOR CELL gives the VICTIM CELL an interference having higher strength (higher than the predetermined threshold) at the time of transmitting an (uplink/downlink) signal, the aforementioned information of the AGGRESSOR CELL which exerts interference with strength (higher than the predetermined threshold value) may be provided to the VICTIM CELL through predefined (backhaul) signaling.

In addition, as described above, the damaged cell (or interference cell) may transmit information of the analog beam related to flexible duplex together with the information (or separately). For example, transmission of the information of the analog beam related to the flexible duplex refer to providing, to the cell, (A) cell (physical) identifier information (thereof) and/or (B) analog beam (FDR_AGG- BEAM) index (/identifier) information to which an FDR operation is applied and/or (C) (analog beam-specific) (time/ frequency) resource use information and/or (D) (analog beam-specific) FDR operation-related (operation) information (e.g., FDR operation period, (time/frequency) resource position to which FDR operation is applied (FDR_AG- GRSC), a resource unit on which the FDR operation is performed), and the like.

Since the transmitted information here and an example of a specific procedure thereof are the same as those described above, and thus, a redundant description of the contents described above (e.g., FIG. 14) will be omitted.

In addition, although not shown separately, for example, a cell which receives the corresponding information (from a specific cell) may recognize (A) (its) analog beam (FDR_VICBEAM) index (/identifier) and/or (analog beam- specific) (time/frequency) resource position (FDR_VI- CRSC) subjected to high interference (e.g., DTU_IFTYPE, UTD_IFTYPE) of different characteristics (from the existing case) from a BRSRP measurement value regarding (a plurality of) specific cell-related analog beams reported from a UE (which performs communication with the cell itself) (or (directly) performed by the cell itself during a predetermined (time) interval).

Also, although not shown, here, for example, the AGGRESSOR CELL receiving the (partial) information above (from the VICTIM CELL) may (A) perform (uplink (/downlink) signal transmission scheduling) using (time/frequency) resource at a position different from AGG_RSC of AGG_BEAM (or VIC_RSC of VIC_BEAM) and/or (B) decrease (transmission) power value when performing (uplink (/downlink) signal transmission is scheduled using (time/frequency) resource at a position different from the AGG_RSC of AGG_BEAM (or VIC_RSC of VIC_BEAM) and/or (C) change (/adjust) a direction of a (transmission) analog beam related to AGG_BEAM (AGG_RSC) and/or (D) offload some (or all of) UEs performing AGG_BEAM (AGG_RSC)-based (uplink (/downlink)) communication to another analog beam (direction) (through an analog beam switching operation) (an effect of lowering AGG_BEAM (AGG_RSC)-based signal transmission performing frequency (/probability)) and/or (E) increase a rate of radio resource for the purpose of uplink (/downlink) (and/or stop application of an FDR operation) when the FDR operation has been applied to AGG_BEAM (AGG_RSC) (or (time/frequency) resource at a position (partially or entirely) overlapping the VIC_RSC of VIC_BEAM) and/or (F) change differently a ratio of resource of uplink or downlink according to an interference type (of AGG_BEAM (AGG_RXC)) (e.g., increase the ratio of resource of uplink (/downlink) when the interference type of AGG_BEAM (AGG_RSC) is DTU_IFTYPE (/UTD_IFTYPE).

In addition, although not shown separately, here, for example, the VICTIM CELL receiving the (partial) information below (from the AGGRESSOR CELL) may (A) perform (uplink (/downlink) signal transmission scheduling) using (time/frequency) resource at a position different from AGG_RSC of AGG_BEAM (or VIC_RSC of VIC_BEAM) and/or (B) increase (transmission) power value when performing (uplink (/downlink) signal transmission is scheduled using (time/frequency) resource at a position different from the AGG_RSC of AGG_BEAM (or VIC_RSC of VIC_BEAM) and/or (C) change (/adjust) a direction of a (reception (/transmission)) analog beam related to VIC_BEAM (VIC_RSC) and/or (D) offload some (or all of) UEs performing VIC_BEAM (VIC_RSC)-based (uplink (/downlink)) communication to another analog beam (direction) (through an analog beam switching operation) (an effect of lowering VIC_BEAM (VIC_RSC)-based signal transmission performing frequency (/probability)) and/or (E) increase a rate of radio resource for the purpose of downlink (/uplink) (and/or stop application of an FDR operation) when the FDR operation has been applied to AGG_BEAM (AGG_RSC) (or (time/frequency) resource at a position (partially or entirely) overlapping the VIC_RSC of VIC_BEAM) and/or (F) change differently a ratio of resource of uplink or downlink according to an interference type (of AGG_BEAM (AGG_RXC)) (e.g., increase the ratio of resource of downlink (/uplink) when the interference type of AGG_BEAM (AGG_RSC) is DTU_IFTYPE (/UTD_IFTYPE).

Since an example of a specific procedure thereof is the same as described above, and thus, a redundant description of the contents described above (e.g., FIG. 14) will be omitted.

Here, a specific example of the pairing process in FIG. 16 may have another embodiment depending on whether a measurement value related to the analog beam for the interference cell (or damaged cell) is to be performed by the UE or by the damaged cell (or interference cell). Hereinafter, details thereof will be described with reference to FIGS. 17 and 18, respectively.

Figure 17:
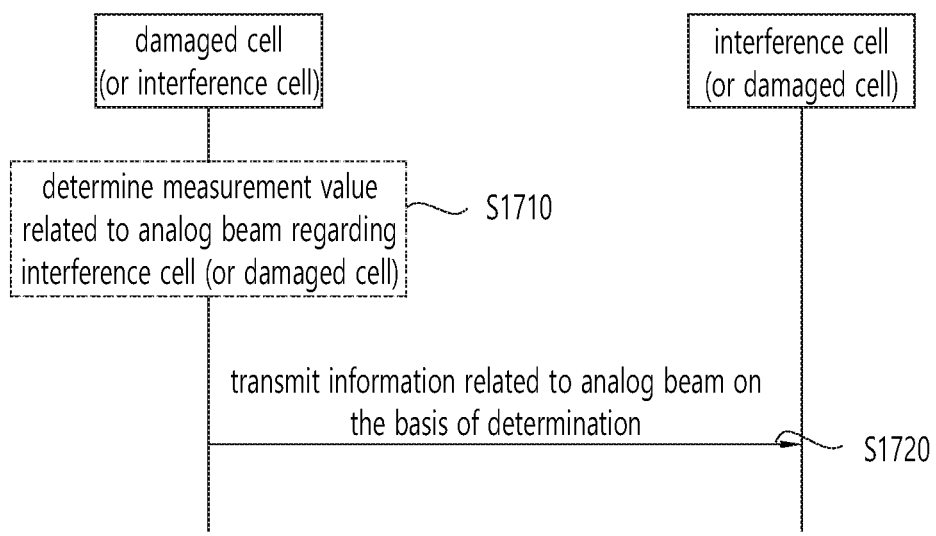
FIG. 17 is a flowchart of a method of transmitting analog beam-related information according to another embodiment of the present invention.

FIG. 17 is a flowchart of a method of transmitting analog beam-related information according to another embodiment of the present invention.

Referring to FIG. 17, the damaged cell determines a measurement value related to an analog beam regarding the interference cell (or the interference cell determines a measurement value related to an analog beam regarding the damaged cell) (S1710).

As described above, for example, (in the Examples #1-1/2/3/4 described above) the VICTIM CELL (A) may stop VIC_BEAM (VIC_RSC)-based uplink signal reception (/downlink signal transmission) during a predetermined (time) period (MUTE_WIN), perform BEAM REFERENCE SIGNAL RECEIVED POWER (BRSRP) measurement (and/or channel measurement) on (a plurality of) analog beams related to the AGGRESSOR CELL, and subsequently regard the AGG_BEAM (AGG_RSC) which exerts interference with strength (higher than the predetermined threshold value) on the VIC_BEAM (VIC_RSC) as (AGGRESSOR CELL) analog beam having the highest measurement value (thereamong).

As described above, for example, when the AGGRESSOR CELL performs AGG_BEAM (AGG_RSC)-based (uplink/downlink)) signal transmission (in the Examples #1-1/2/3/4 described above), the AGGRESSOR CELL may (A) stop the AGG_BEAM (AGG_RSC)-based uplink signal reception (/downlink signal transmission) during a predetermined (time) period (MUTE_WIN), perform the BRSRP measurement (and/or channel measurement) on the (plurality of) VICTIM CELL-related analog beam, and subsequently regard the VIC_BEAM (VIC_RSC) which exerts interference with strength (higher than the predetermined threshold value) as the (VICTIM CELL) analog beam having the highest measurement value (thereamong).

Since the transmitted information here and an example of a specific procedure thereof are the same as described above, and thus, a redundant description of the contents described above (e.g., FIG. 14) will be omitted.

Thereafter, the damaged cell (or interference cell) may transmit information related to the analog beam on the basis of the determination (S1720). The information to be transmitted here and an example of a specific procedure therefor are the same as those described above. Since the transmitted information here and an example of a specific procedure thereof are the same as described above, and thus, a redundant description of the contents described above (e.g., FIG. 14) will be omitted.

Figure 18:
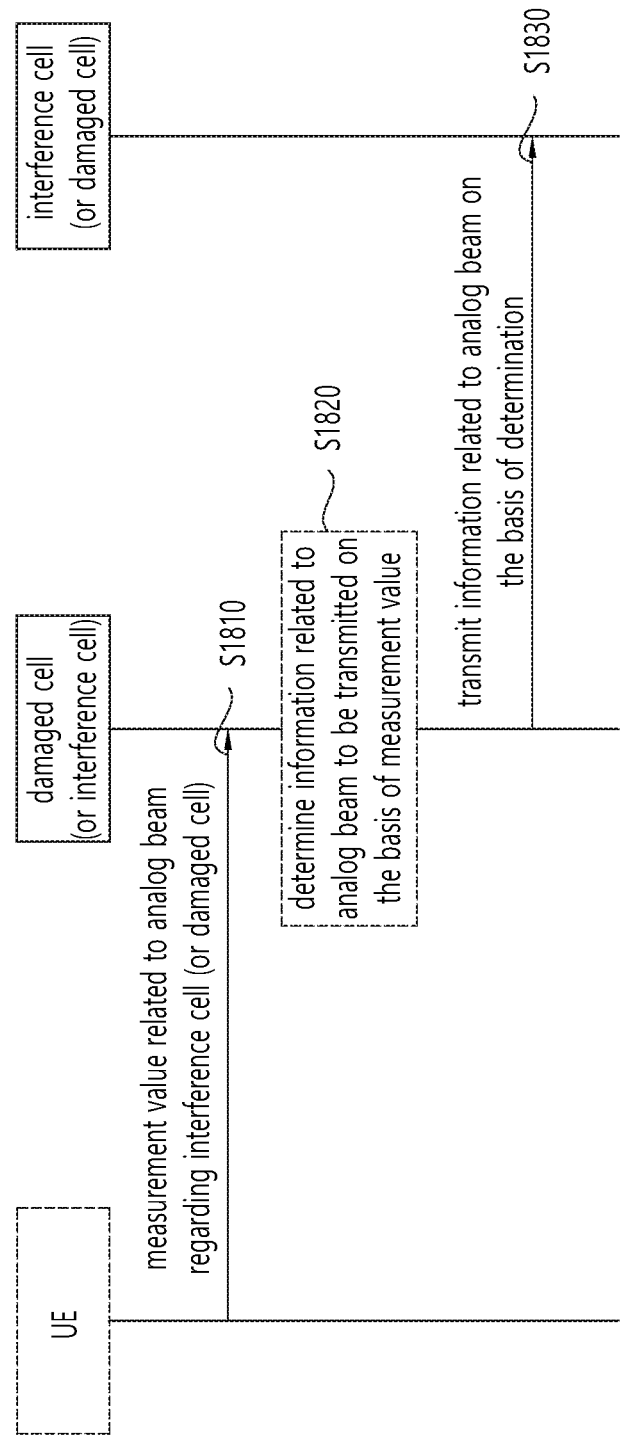
FIG. 18 is a flowchart of a method of transmitting analog beam-related information according to another embodiment of the present invention.

FIG. 18 is a flowchart of a method of transmitting analog beam-related information according to another embodiment of the present invention.

Referring to FIG. 18, the damaged cell (or the interference cell) receives a measurement value related to an analog beam regarding the interference cell (or the damaged cell) from the UE (S1810).

As described above, for example, (in the Examples #1-1/2/3/4 described above) the VICTIM CELL (B) may be reported a BRSRP measurement value (and/or channel measurement value) (UE_MRPT) regarding (a plurality of) AGGRESSOR CELL-related analog beams from the UE performing VIC_BEAM (VIC_RSC)-based communication and subsequently regard the AGG_BEAM (AGG_RSC) which exerts interference with strength (higher than the predetermined threshold value) on the VIC_BEAM (VIC_RSC) as (AGGRESSOR CELL) analog beam having the highest measurement value (thereamong).

As described above, for example, when the AGGRESSOR CELL performs AGG_BEAM (AGG_RSC)-based (uplink/downlink)) signal transmission (in the Examples #1-1/2/3/4 described above), the AGGRESSOR CELL may be reported the BRSRP measurement value (and/or channel measurement value) regarding the (plurality of) VICTIM CELL-related analog beams (UE_MRPT) and subsequently regard the VIC_BEAM (VIC_RSC) which exerts interference with strength (higher than the predetermined threshold value) as the (VICTIM CELL) analog beam having the highest measurement value (thereamong).

Since the transmitted information here and an example of a specific procedure thereof are the same as described above, and thus, a redundant description of the contents described above (e.g., FIG. 14) will be omitted.

Thereafter, the damaged cell (or interference cell) may determine information related to the analog beam to be transmitted on the basis of the measurement value (S1820). The damaged cell (or interference cell) may transmit information related to the analog beam on the basis of the determination (S1830). Here, for ease of understanding, steps S1820 and S1830 are described as separate steps, but these steps may be merged as a single step. Since the transmitted information here and an example of a specific procedure thereof are the same as described above, and thus, a redundant description of the contents described above (e.g., FIG. 14) will be omitted.

For example, the embodiments of the present invention will be described with reference to the drawings from a view point of 'transmitting information of an analog beam related to flexible duplex' as follows.

As described above, in the related art wireless communication system, wireless communication is not performed in an analog beam-specific manner. Thus, since the analog beam-specific wireless communication is not performed in the related art, an analog beam-specific flexible duplex (FDR) operation is not considered in the related art.

However, in a wireless communication situation in which the analog beam-specific operation is present, application of the FDR operation may be different in an analog beam-specific manner. This is because, in a situation where there is an analog beam, there will be an area covered by each of the analog beams, and a load of the UE may vary for each area covered by each of the analog beams.

Here, in FIG. 19, a method in which a specific cell transmits information of an analog beam regarding its flexible duplex to another cell to perform a flexible duplex operation therebetween will be described.

Here, flexible duplex (FDR) may refer to reassigning resource reserved for a specific use as resource for another use. When a resource for a specific use is diverted to a resource for another use, uplink resource and/or downlink resource may be reallocated in consideration of the degree of uplink traffic occurrence and the degree of downlink traffic occurrence, and thus, flexibility of wireless communication may be increased. For example, for high flexibility, resource reserved for uplink may be reallocated as downlink resource, and similarly, resource reserved for downlink may be reallocated as uplink resource. Here, for the sake of understanding of the invention, the uplink resource or the downlink resource is exemplified for a specific use resource, but the embodiment of the present invention is not limited thereto.

Figure 19:
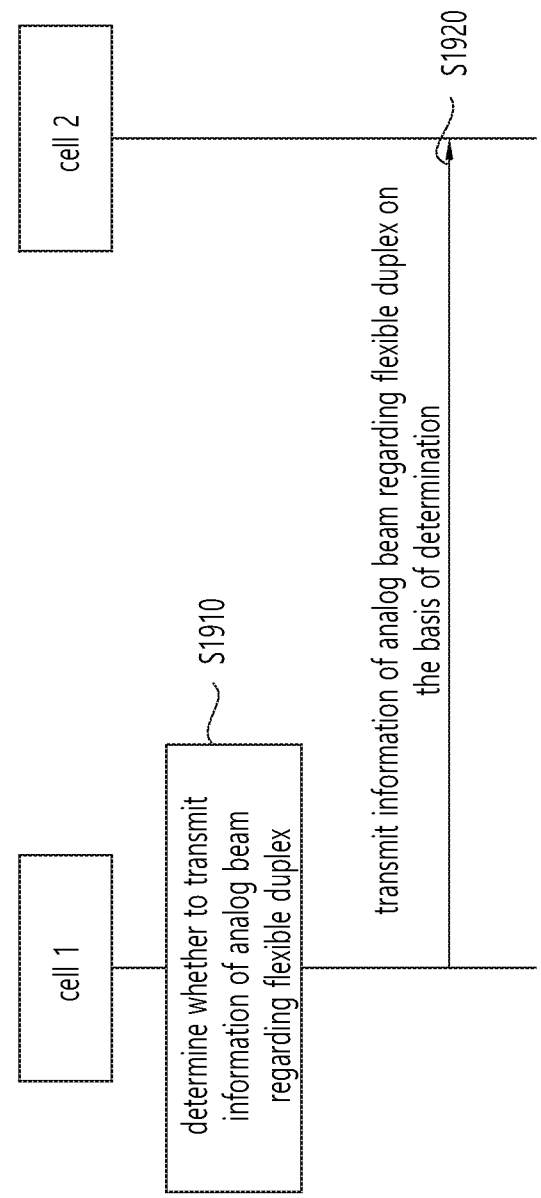
FIG. 19 is a flowchart of a method of transmitting analog beam-related information according to another embodiment of the present invention.

FIG. 19 is a flowchart of a method of transmitting analog beam-related information according to another embodiment of the present invention.

Referring to FIG. 19, a first cell (or a first BS) may determine whether to transmit information of an analog beam related to flexible duplex (S1910).

For example, transmission of information of an analog beam related to flexible duplex may refer to providing (A) (its own) cell identifier information and/or (B) an analog beam (FDR_AGGBEAM) index (/identifier) information to which an FDR operation is applied and/or (C) (analog beam-specific) (time/frequency) resource use information and/or (D) (analog beam-specific) FDR operation-related (operation) information (e.g., FDR operation period, (time/frequency) resource position (FDR_AGGRSC) to which the FDR operation is applied, resource unit in which FDR operation is performed), and the like.

Since the transmitted information here and an example of a specific procedure thereof are the same as described above, and thus, a redundant description of the contents described above (e.g., FIG. 14) will be omitted.

Thereafter, the first cell may transmit the information of the analog beam related to flexible duplex on the basis of the determination (S1920).

Here, for example, a cell receiving corresponding information (from the specific cell) may recognize (A) analog beam (FDR_VICBEAM) index (/identifier) receiving high interference (e.g., DTU_IFTYPE, UTD_IFTYPE) of different characteristics (from the existing case) from the FDR_AGGBEAM (FDR_AGGRSC) and/or (analog beam-specific) (time/frequency) resource position (FDR_VICRSC) on the basis of the BRSRP measurement value (and/or the channel measurement value) regarding (a plurality of) analog beams related to a specific cell (directly performed by itself) during a period reported from the UE (performing communication therewith) (or during predetermined (time) period). Here, for example, regarding the FDR_AGGBEAM (FDR_AGGRSC), a (reception) analog beam which has obtained the highest measurement value (and/or an analog beam to which a UE which has reported the highest measurement value belongs) may be regarded as the FDR_VICBEAM (FDR_VICRSC).

Hereinafter, for the convenience of understanding, a redundant description of the contents described above (e.g., FIG. 14) will be omitted.

For example, the embodiments of the present invention will be described with reference to the drawings from a viewpoint that the UE reports an RSSI to a serving cell' as follows.

Figure 20:
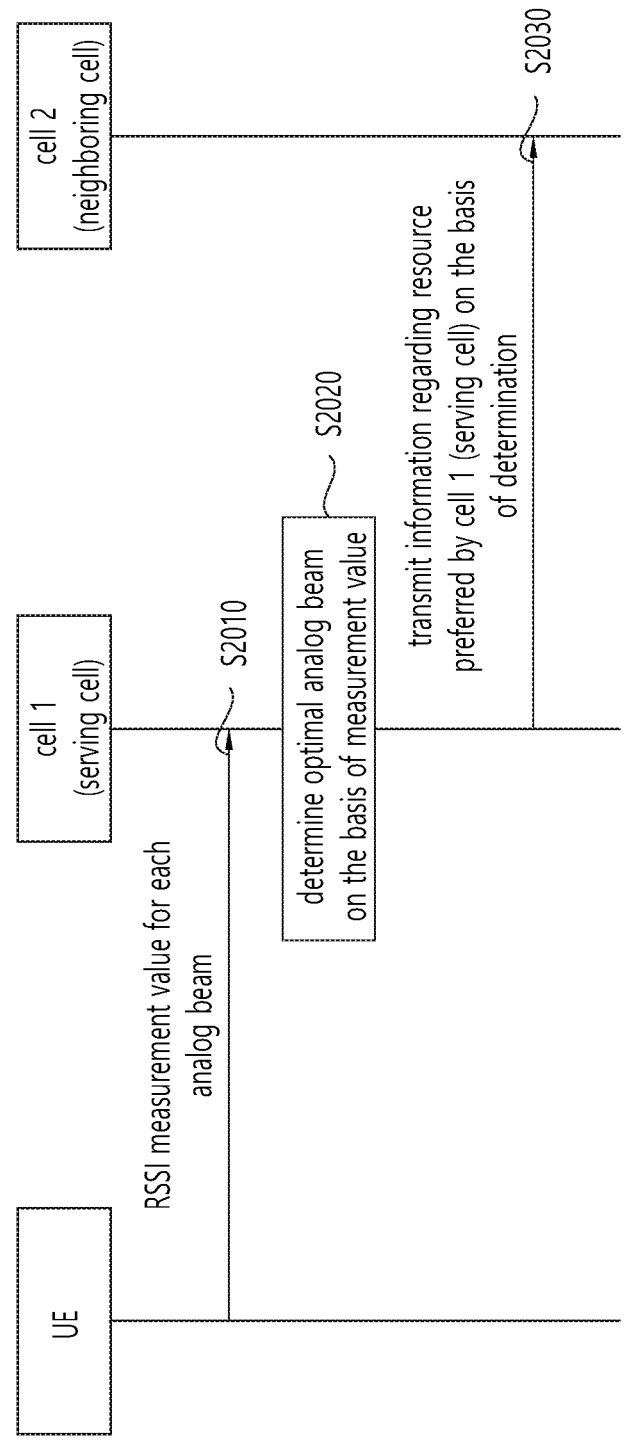
FIG. 20 is a flowchart of a method of transmitting analog beam-related information according to another embodiment of the present invention.

As described above, it may be desirable that an optimal analog beam related to a specific UE is determined in consideration of an RSSI value rather than being corrected only by an RSRP value. This is because, in actual communication, interference due to UEs may be more significant. In FIG. 20, a method in which a UE transmits an RSSI value for each analog beam to a serving cell will be described.

FIG. 20 is a flowchart of a method of transmitting analog beam-related information according to another embodiment of the present invention.

Referring to FIG. 20, a first cell (or a first BS) may receive information (e.g., an RSSI measurement value) regarding an RSSI for each analog beam from the UE (S2010). As described above, for example, when a serving cell determines an optimal analog beam index (/identifier) (and/or a BRS ID) (to be used for communication) related to a specific UE, in order to consider the amount of interference that may be made when (downlink (/uplink)) data communication is actually performed (thereafter), the (corresponding) UE may additionally report an RSSI measurement value (and/or RSRQ measurement value (e.g., a value of a ratio between the BRSRP measurement value and the RSSI measurement value)) (in addition to the BRSRP measurement value) for each analog beam (and/or each BRS ID).

Here, for example, the RSSI measurement related to a specific analog beam (and/or BRS ID) may be performed on (A) a (symbol) resource (RSSI_SYM) on which the BRS of the associated identifier (ID) is transmitted (e.g., a remaining (energy) value obtained by removing BRS (sequence (/energy)) may be reported as the RSSI measurement value) and/or (B) on a predetermined (/signaled) (symbol) resource (RSSI_SYM) in which a reference signal (rather than BRRS) of a specific antenna port is transmitted) of a (time) interval in which a corresponding (specific) analog beam (and/or BRS ID)-based (downlink (/uplink)) data communication is performed. Hereinafter, for the purposes of description, a redundant description of the contents described above (e.g., FIG. 14) will be omitted.

Thereafter, the first cell may determine an optimal analog beam on the basis of the measured values (S2020).

Thereafter, the first cell may transmit information regarding a resource preferred by the first cell on the basis of the determination (S2030).

Here, for example, in order to allow external interference (to be exerted when actual (downlink (/uplink)) data communication is performed) to be (effectively) reflected on the RSSI_SYM in which RSSI measurement is performed, RSSI_SYM positions of different cells may be set not to overlap as possible. Here, for example, through predefined (backhaul) signaling, a specific cell may share its (or preferred) RSSI_SYM position information with another (neighboring) cell. For example, by setting transmission periods of the reference signal (e.g., BRS) used for analog beam measurement to be different between (some) cells, the corresponding (analog beam) measurement operation may be performed effectively.

Here, for example, (additionally) between cells, (A) time (/frequency) resource position information for transmitting an analog beam measurement-related reference signal of each cell and/or (B) a time (/frequency) resource position information for performing another cell-related analog beam measurement operation (after each cell stops a preferred or downlink transmission (/uplink reception) operation (or a UE performing communication with each cell stops (preferred or downlink reception (/uplink transmission) operation)) may be exchanged (through backhaul signaling).

Hereinafter, for the sake of understanding, a redundant description of the contents described above (e.g., FIG. 14) will be omitted.

For example, the embodiments of the present invention will be described with reference to the drawings from a view point of 'transmitting information regarding flexible duplex' as follows.

Figure 21:
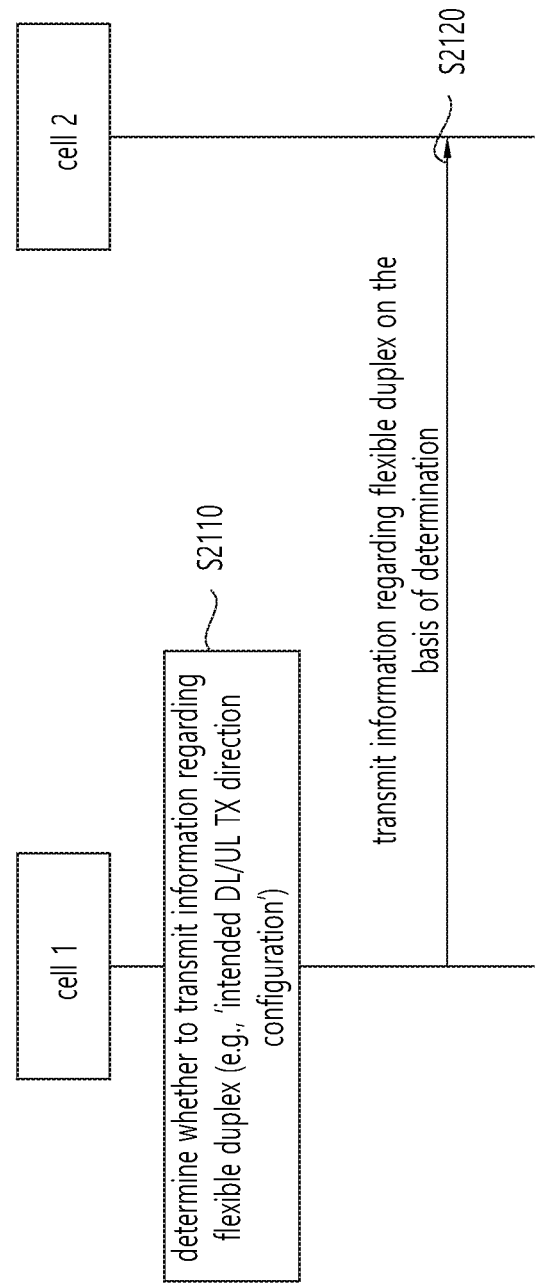
FIG. 21 is a flowchart of a method of transmitting analog beam-related information according to another embodiment of the present invention.

As described above, in order to efficiently perform flexible duplex in mutually different numerological environments, it may be necessary for a specific cell to transmit information for performing flexible duplex to another cell in the mutually different numerological environments. Here, the information regarding the flexible duplex may be specific to the analog beam described above. In other words, it may mean that the specific cell transmits the information regarding the flexible duplex according to each analog beam to the other cell. In FIG. 21, a method in which a UE transmits information regarding flexible duplex will be described.

FIG. 21 is a flowchart of a method of transmitting analog beam-related information according to another embodiment of the present invention.

Referring to FIG. 21, a first cell (or a first BS) may determine whether to transmit information regarding flexible duplex (e.g. 'intended DL/UL TX direction configuration'). Here, as described above, the information regarding the flexible duplex may refer to 'intended DL/UL transmission direction configuration' which may include (all or some of) periodicity information, numerology information, the number of symbols in a basic time unit, and direction information. Hereinafter, for the convenience of understanding, a redundant description of the contents described above (e.g., FIG. 14) will be omitted.

Thereafter, the first cell may transmit information regarding the flexible duplex on the basis of the determination (S2120). Also, for example, the first cell and the second cell use different numerologies, and the information regarding the analog beam may be information regarding flexible duplex. Also, for example, the information regarding the flexible duplex may include at least one of periodicity information, numerology information, information regarding the number of symbols, and direction information. Also, for example, the periodicity information may be information regarding a period in which the information regarding the flexible duplex is repeatedly applied, the numerology information may be information regarding subcarrier spacing for the period, the information regarding the number of symbols may be Information regarding the number of symbols in a basic time unit, and the direction information may be information regarding a transmission direction of each symbol constituting the basic time unit. Here, the information regarding the flexible duplex and the operation in the second cell receiving the same are the same as those of FIGS. 14 to 15 described above. Hereinafter, for convenience of understanding, a redundant description of the contents described above (e.g., FIGS. 14 and 15) will be omitted.

Figure 22:
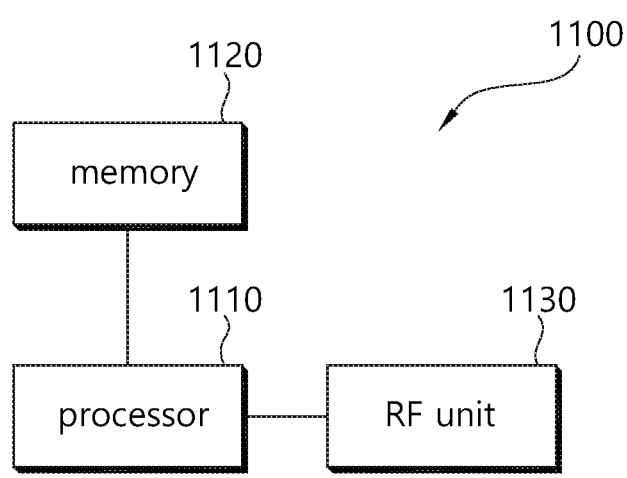
FIG. 22 is a block diagram illustrating an entity (UE or BS) in which an embodiment of the present invention is implemented.

FIG. 22 is a block diagram illustrating an entity (UE or BS) in which an embodiment of the present invention is implemented.

Referring to FIG. 22, an entity (UE or BS) 1100 includes a processor 1110, a memory 1120, and a radio frequency (RF) unit 1130.

According to an embodiment, the processor 1110 may implement the functions/operations/methods described in the present invention. For example, the processor 1110 may be configured to determine information regarding an analog beam to be transmitted. The processor 1110 may be configured to transmit information regarding the analog beam to another entity on the basis of the determination.

The RF unit 1130 is connected to the processor 1110 to transmit and receive a wireless signal.

The processor may include application-specific integrated circuits (ASICs), other chipsets, logic circuits, and/or data processors. The memory may include read-only memory (ROM), random access memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be present within or outside the processor and connected to the processor using a well-known means.

What is claimed is:

1. A method for transmitting analog beam-related information performed by a first entity in a wireless communication system, the method comprising:
    determining information regarding an analog beam to be transmitted; and
    transmitting the information regarding the analog beam to a second entity on the basis of the determination, wherein the first entity is a damaged cell, and the second entity is an interference cell, and
wherein the information regarding the analog beam includes information identifying an analog beam of the damaged cell interfered by the interference cell.

2. The method of claim 1, wherein
the information regarding the analog beam includes at least one of a cell identifier of the damaged cell, resource position information of the damaged cell with respect to the analog beam, load information of the damaged cell with respect to the analog beam, and interference information for each resource of the damaged cell with respect to the analog beam.

3. The method of claim 1, wherein
the information regarding the analog beam further includes information identifying an analog beam of the interference cell interfering with the damaged cell.

4. The method of claim 3, wherein
the information regarding the analog beam further includes a cell identifier of the interference cell and resource position information of the interference cell with respect to the analog beam.

5. The method of claim 1, wherein
the first entity is a first cell, the second entity is a second cell,
the method further comprises receiving a measurement value related to an analog beam regarding the second cell from a UE,
wherein information regarding the analog beam is determined on the basis of the measurement value.

6. The method of claim 1, wherein
the first entity is a first cell, the second entity is a second cell,
the information regarding the analog beam is analog beam information to which a flexible duplex operation is applied, and
the analog beam information to which the flexible duplex operation is applied includes at least one of cell identifier information of the first cell, identifier information of the analog beam to which the flexible duplex operation is applied, and operation information regarding the flexible duplex operation.

7. The method of claim 1, wherein
the first entity is a first cell, the second entity is a second cell,
the first cell and the second cell use different numerologies, and
the information regarding the analog beam is information regarding flexible duplex.

8. The method of claim 7, wherein
the information regarding the flexible duplex includes at least one of periodicity information, numerology information, information regarding the number of symbols, and or direction information.

9. The method of claim 8, wherein
the periodicity information is information regarding a period in which the information regarding the flexible duplex is repeatedly applied,
the numerology information is information regarding subcarrier spacing for the period,
the information regarding the number of symbols is information regarding the number of symbols in a basic time unit, and
the direction information is information regarding a transmission direction of each symbol constituting the basic time unit.

10. An entity, as a first entity, comprising:
a transceiver transmitting and receiving a wireless signal; and
a processor connected to the transceiver to operate,
wherein
the processor is configured to:
determine information regarding an analog beam to be transmitted, and
control the transceiver to transmit information regarding the analog beam to a second entity on the basis of the determination,
wherein the first entity is a damaged cell, and the second entity is an interference cell, and
wherein the information regarding the analog beam includes information identifying an analog beam of the damaged cell interfered by the interference cell.

* * * * *